(12) United States Patent
Kitabatake

(10) Patent No.: US 10,671,365 B2
(45) Date of Patent: Jun. 2, 2020

(54) INFORMATION PROCESSING APPARATUS, STORAGE MEDIUM, AND CONTROL METHOD

(71) Applicant: CANON KABUSHIKI KAISHA, Tokyo (JP)

(72) Inventor: Hironobu Kitabatake, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/014,989

(22) Filed: Jun. 21, 2018

(65) Prior Publication Data

US 2018/0373519 A1    Dec. 27, 2018

(30) Foreign Application Priority Data

Jun. 27, 2017  (JP) ................................ 2017-125531

(51) Int. Cl.
| | |
|---|---|
| *G06F 8/61* | (2018.01) |
| *H04L 29/12* | (2006.01) |
| *G06F 3/12* | (2006.01) |
| *G06F 9/4401* | (2018.01) |

(52) U.S. Cl.
CPC ................. *G06F 8/61* (2013.01); *G06F 3/12* (2013.01); *G06F 3/1204* (2013.01); *G06F 3/1225* (2013.01); *G06F 3/1285* (2013.01); *G06F 9/4411* (2013.01); *H04L 61/103* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0047414 A1* | 2/2011 | Kudo | .................... | G06F 11/079 714/37 |
| 2011/0261396 A1* | 10/2011 | Takahashi | ............. | G06F 3/1204 358/1.15 |
| 2012/0110673 A1* | 5/2012 | Hoglund | ............... | G06F 21/568 726/25 |
| 2013/0063746 A1* | 3/2013 | Araki | .................... | G06F 3/1204 358/1.13 |
| 2014/0300914 A1* | 10/2014 | Yamazaki | ............. | G06F 3/1204 358/1.13 |
| 2017/0193127 A1* | 7/2017 | Chen | .................... | G06F 16/176 |
| 2018/0267750 A1* | 9/2018 | Kobayashi | ............ | G06F 3/1225 |

FOREIGN PATENT DOCUMENTS

JP        2006-252095 A      9/2006

* cited by examiner

*Primary Examiner* — Helen Zong
(74) *Attorney, Agent, or Firm* — Canon U.S.A., Inc. IP Division

(57) ABSTRACT

An information processing apparatus according to embodiments of the present invention installs a printer driver by specifying a name of a logical printer, adds customization information for changing a setting of the printer driver to a database, and deletes a logical printer of the specified name from the operating system if it is determined that addition of the customization information to the database has failed with respect to the logical printer.

22 Claims, 22 Drawing Sheets

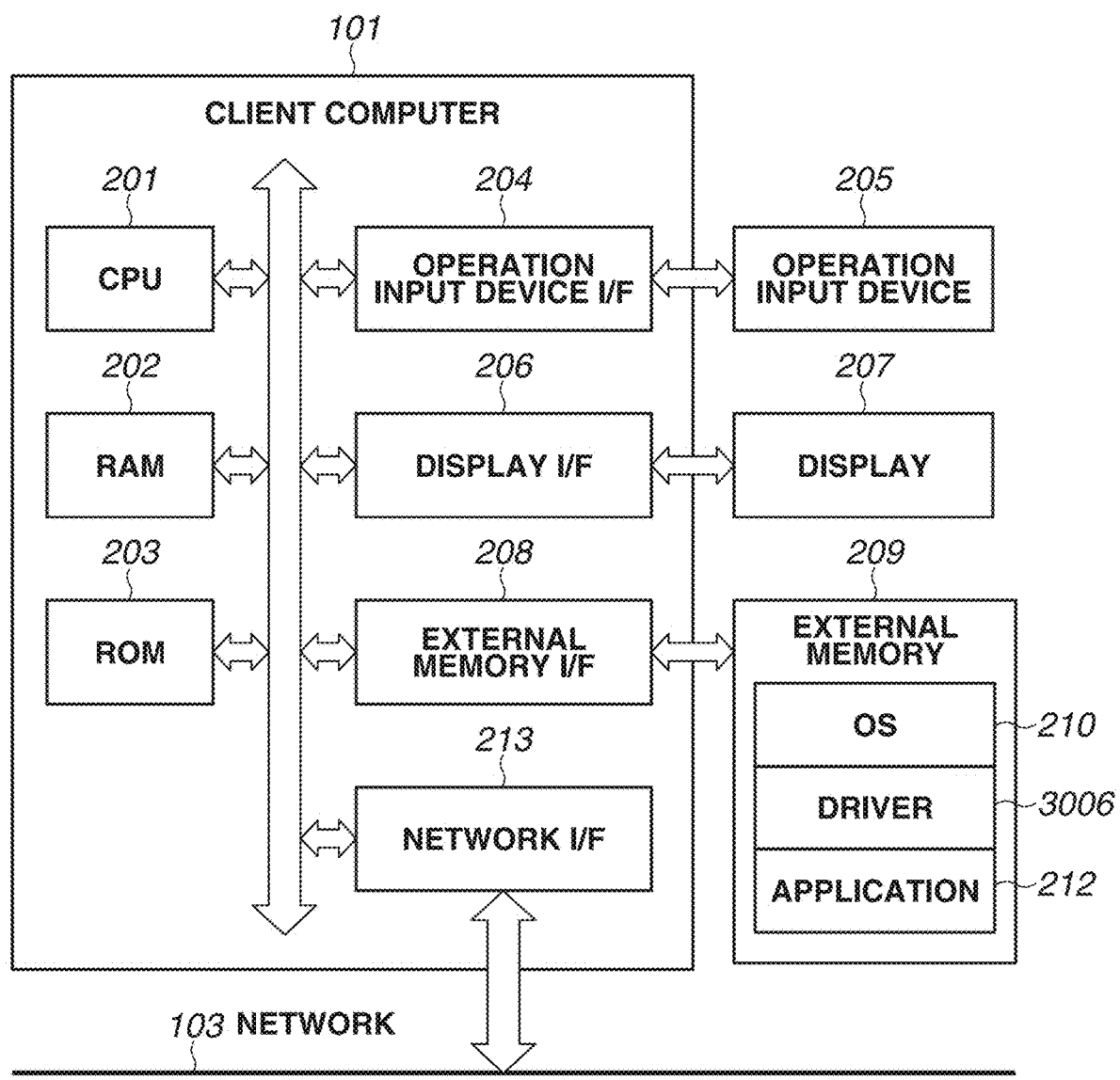

FIG.4A

```xml
<?xml version="1.0" encoding="UTF-8"?>
    <Properties xmlns="http://active/pdrv/driverconfiguration/v100">
        <Printer Modelname="MFP 1000">   ~400
            <Customized>ON</Customized>   ~401
            <PrefixString>MFP 1000\</PrefixString>   ~402
        </Printer>
        <Printer Modelname="MFP 2000">
            <Customized>OFF</Customized>
            <PrefixString>MFP 1000\</PrefixString>
        </Printer>
        <Printer Modelname="SFP 1000">
            <Customized>ON</Customized>
            <PrefixString>SFP 1000\</PrefixString>
        </Printer>
        <Printer Modelname="SFP 2000">
            <Customized>OFF</Customized>
            <PrefixString>SFP 2000\</PrefixString>
        </Printer>
</Properties>
```

FIG.4B

```xml
<?xml version="1.0" encoding="UTF-8"?>
<Features xmlns="http://active/pdrv/driverconfiguration/v100">
  <Feature Name="CustomCode">
    <Value>
      <Data>Custom Driver</Data>   ~410
    </Value>
  </Feature>
  <Feature Name="CustomDriverVersion">
    <Value>
      <Data>6.1.0.0</Data>   ~411
    </Value>
  </Feature>
  <Feature Name="CustomApplicationName">
    <Value>
      <Data>Cusom Tool</Data>   ~412
    </Value>
  </Feature>
  <Feature Name="CustomApplicationVersion">
    <Value>
      <Data>1.0.0.0</Data>   ~413
    </Value>
  </Feature>
</Features>
```

FIG.4C

```xml
<?xml version="1.0" encoding="utf-8"?>
<CustomDefault xmlns="http://www.canon.com/ns/active/pdrv/custom/default/v100">
    <PrintSettingsDelta>
        <psf:PrintTicket xmlns:psf="http://2003/08/printing/printschemaframework"
 xmlns:xsi="http://www.w3.org/2001/XMLSchema-instance"
 xmlns:xsd="http://www.w3.org/2001/XMLSchema"
 version="1"
 xmlns:ns0000="http://www.canon.com/ns/printschema/oip/v200"
 xmlns:psk="http://schemas.microsoft.com/windows/2003/08/printing/printschemakeywords"
 xmlns:pskv11="http://schemas.microsoft.com/windows/2013/05/printing/printschemakeywordsv11">
            <psf:Feature name="psk:PageOutputColor">
                <psf:Option name="psk:Monochrome" /> ~420
            </psf:Feature>
        </psf:PrintTicket>
    </PrintSettingsDelta>
</CustomDefault>
```

FIG.4D

```xml
<?xml version="1.0" encoding="UTF-8"?>
-<Properties xmlns="http://2011/08/printing/queueproperties">
-<Property Name="ColorProfileInformation">
<String/>
</Property>
-<Property Name="CustomDefault">        ~430
<String/>
</Property>
-<Property Name="CustomFavoritesData">
<String/>
</Property>
-<Property Name="CustomFavoritesList">
<String/>
</Property>
-<Property Name="CustomItem">
<String/>
</Property>
-<Property Name="CustomObjective">
<String/>
</Property>
-<Property Name="CustomQPBData">
<String/>
</Property>
-<Property Name="CustomUIControl">
<String/>
</Property>
-<Property Name="CustomWatermarksData">
<String/>
</Property>
-<Property Name="CustomWatermarksList">
<String/>
</Property>
-<Property Name="FormFileInformation">
<String><XmlData><Feature Name="DriverUIOverlayFileList" /></XmlData></String>
</Property>
-<Property Name="MediaTypeInformation">
<String><XmlData><Feature Name="DriverUIMediaType2" /></XmlData> </String>
</Property>
-<Property Name="Config:PrinterOptionPODDeckLiteB1">
<String>Installed</String>
</Property>
-<Property Name="Config:PrinterInfoDrawer4">
431~  <String>Installed</String>
</Property>
-<Property Name="Config:AdminInfoAlwaysSecurePrint">
<String>AlwaysSecurePrint</String>
</Property>
</Properties>
```

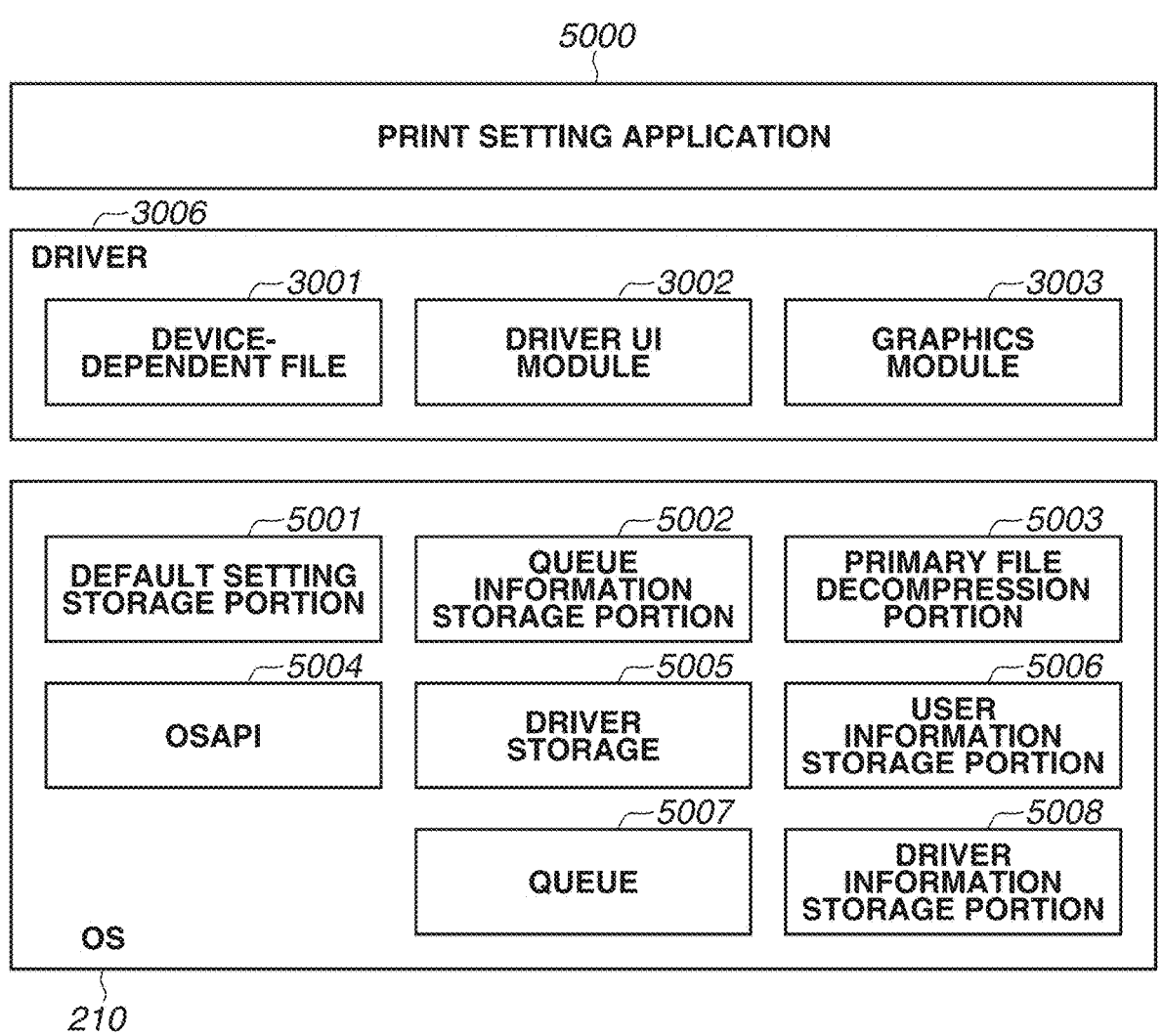

INFORMATION PROCESSING APPARATUS, STORAGE MEDIUM, AND CONTROL METHOD

BACKGROUND OF THE INVENTION

Field of the Invention

The present invention relates to a technique for installing a printer driver.

Description of the Related Art

Conventionally, there has been provided a technique for installing a printer driver. Japanese Patent Application Laid-Open No. 2006-252095 discusses a technique for installing a printer driver by using an installer.

SUMMARY OF THE INVENTION

According to embodiments of the present invention, an information processing apparatus configured to execute an operating system includes an installation unit configured to install a printer driver by specifying a name of a logical printer, an addition unit configured to add, to a database, customization information for changing a setting of the printer driver, to be applied to the logical printer, a determination unit configured to determine whether addition of the customization information to the database has succeeded with respect to the logical printer, and a deletion unit configured to delete the logical printer of the specified name from the operating system if the determination unit determines that the addition of the customization information to the database has failed with respect to the logical printer.

Further features of the present invention will become apparent from the following description of exemplary embodiments with reference to the attached drawings.

BRIEF DESCRIPTION OF THE DRAWINGS

FIG. 2 is a block diagram illustrating a hardware configuration of a client computer.

FIGS. 4A, 4B, 4C, and 4D are diagrams illustrating examples of data relating to customization.

FIG. 5 is a block diagram illustrating configurations of a print setting application, a driver, and an operating system (OS).

DESCRIPTION OF THE EMBODIMENTS

Figure 1:
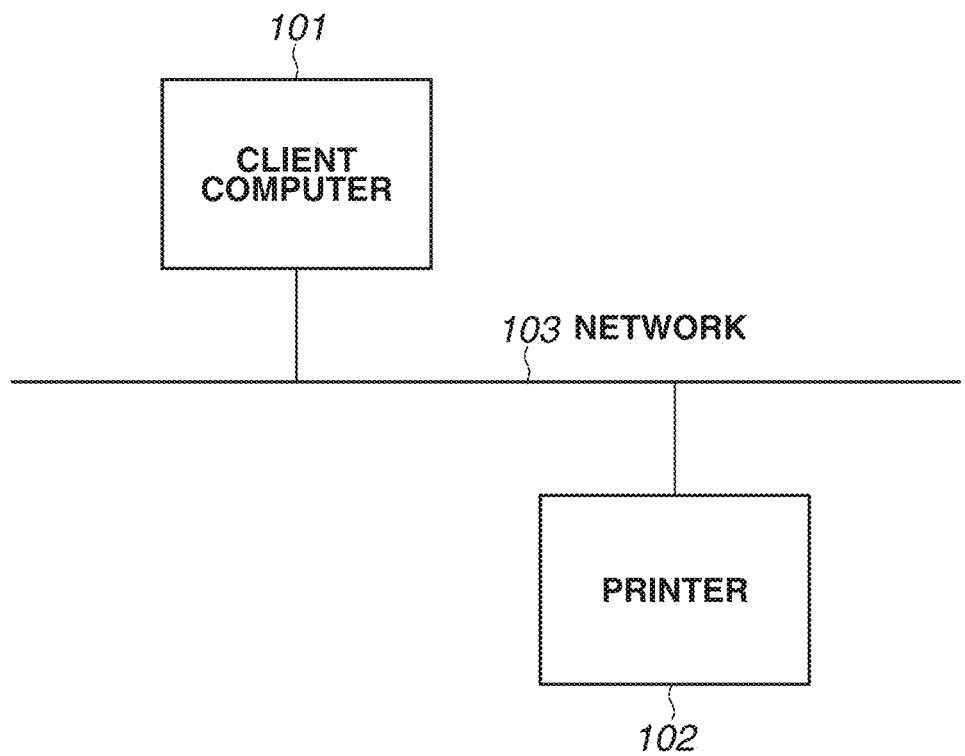
FIG. 1 is a block diagram illustrating a system configuration.

Setting of a printer driver is executed based on a value specified at the time of factory shipment or information acquired from a printer. In addition to the information set through a normal operation, there is a case where the user would like to set a default print setting having a value different from a value previously specified at the time of factory shipment or to set their own customized setting such as a setting for prohibiting a change of a specific print setting. In this specification document, the above-described customization is realized in such a manner that customization information for changing a setting of a printer driver, which is to be applied to a logical printer, is added to a database.

However, because the customization information is added to the database after executing installation of a printer driver and generation of a logical printer, there is an issue that an unintended logical printer may be configured if addition of the customization information has failed. Specifically, a logical printer with erroneous customization information or a logical printer without having customization information may remain in an operating system.

With respect to the above issue, embodiments of the present invention are directed to a method of reducing a possibility of leaving the unintended logical printer in the operating system.

A printer driver is a module installed in a client computer and configured to execute rendering processing according to a print setting or a print request to a corresponding printer. With respect to a printer driver, there is a demand in market for generating a driver set in which a value of a default print setting specified at the time of factory shipment is changed to a different value. For example, this can be realized if an information technology (IT) manager generates a customized driver set having a default print setting that is previously changed, so that each user is allowed to execute installation through the customized driver set. By employing the above-described method, it is possible to reduce a man-hour for a user to change a print setting of a printer driver after installation. In order to cope with the above-described demand, a vendor is requested to provide a method of easily generating a customized driver set.

When a user gives a printing instruction to a printer, the user inputs a printing instruction through an application, selects a printer from a printer list displayed on a screen, and specifies a print setting. Herein, an object called a print queue (logical printer), which represents a printer as an output destination, is displayed in the printer list displayed on the screen. A printer driver is provided in correspondence with each print queue.

In this situation, when installation is being executed through a driver set having a print setting that is previously changed, a failure may occur in installation because customization information for changing a setting of a printer driver cannot be written or has been written imperfectly for some reason. For example, when a customization setting is executed on a set default setting, writing of the customization information may fail if a setting of an item which is not included in the set default setting is to be written. In such a case, a print queue having imperfect customization information is generated. If the printer driver is used in such a state, there is a possibility that the printer driver is operated according to the imperfect information to perform an unexpected operation. Specifically, there is a possibility that a restriction is placed excessively or a restriction that should not be placed may be placed. Therefore, in a case where writing of the customization information has failed, it is necessary to prevent an erroneous operation by deleting the generated print queue. At this time, deletion of the print queue may fail if a name of the print queue is changed at a timing of deleting the print queue.

Hereinafter, in this specification document, a configuration for solving the above-described issue will be described.

A first exemplary embodiment will be described. FIG. 1 is a block diagram schematically illustrating a general system configuration according to embodiments of the present invention. The system includes a client computer 101 as one example of the information processing apparatus and a printer 102 capable of executing printing by receiving print data in a page description language (PDL) format. The client computer 101 and the printer 102 can communicate with each other through a network 103 including a wide area network (WAN).

The printer 102 may be a single-function printer having only a printing function, or may be a multi-function printer having a printing function, a scanning function, and a copying function. Further, one or more client computers 101 may be connected to the network 103.

FIG. 2 is a block diagram illustrating a hardware configuration of the client computer 101 in FIG. 1. In the client computer 101, a central processing unit (CPU) 201 controls devices connected to a system bus according to a program stored in a random access memory (RAM) 202. The client computer 101 includes at least one CPU 201. In addition, the CPU 201 executes processing based on a program stored in an external memory 209, so that a software configuration of the client computer 101 and steps of processing illustrated in below-described flowcharts are realized thereby. The RAM 202 functions as a main memory or a work area of the CPU 201. A memory 203 is a read only memory (ROM). Various programs such as a boot program and a basic input/output system (BIOS) are written into the ROM 203. An operation input device interface (I/F) 204 controls an operation input device 205 such as a keyboard, a pointing device (i.e., mouse), or a touch user interface (UI). A display I/F 206 controls display of screens on a display 207. An external memory I/F 208 controls access to the external memory 209 such as a hard disk (HD) or a solid-state drive (SSD). The external memory 209 includes an operating system (OS) program 210, an application 212 corresponding to each of a touch panel and a desktop, and a driver 3006 including a printer driver. Then, the external memory 209 stores various files and functions as a storage medium readable by the client computer 101. A network I/F 213 is connected to the printer 102 via the network 103, and executes communication control processing.

Figure 3A:
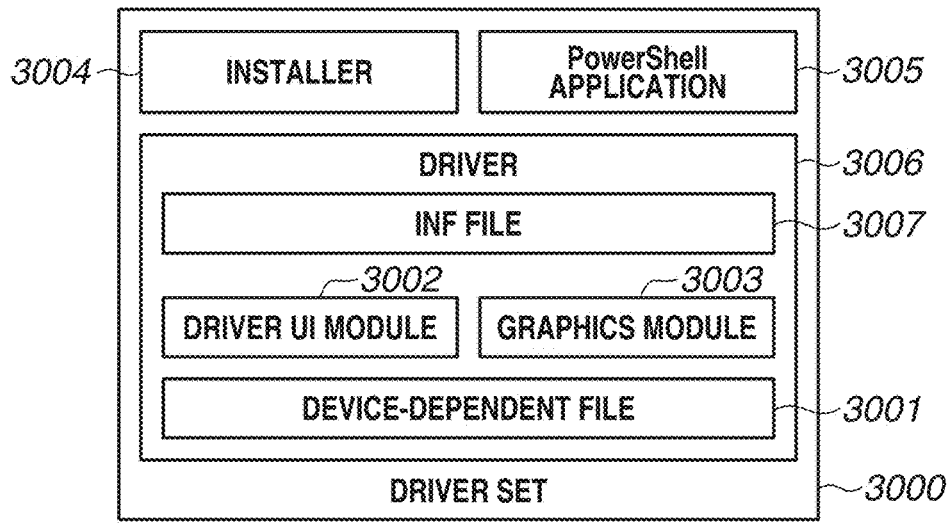
FIGS. 3A, 3B, and 3C are block diagrams illustrating configurations of a driver set and a customization tool.
Figure 3B:
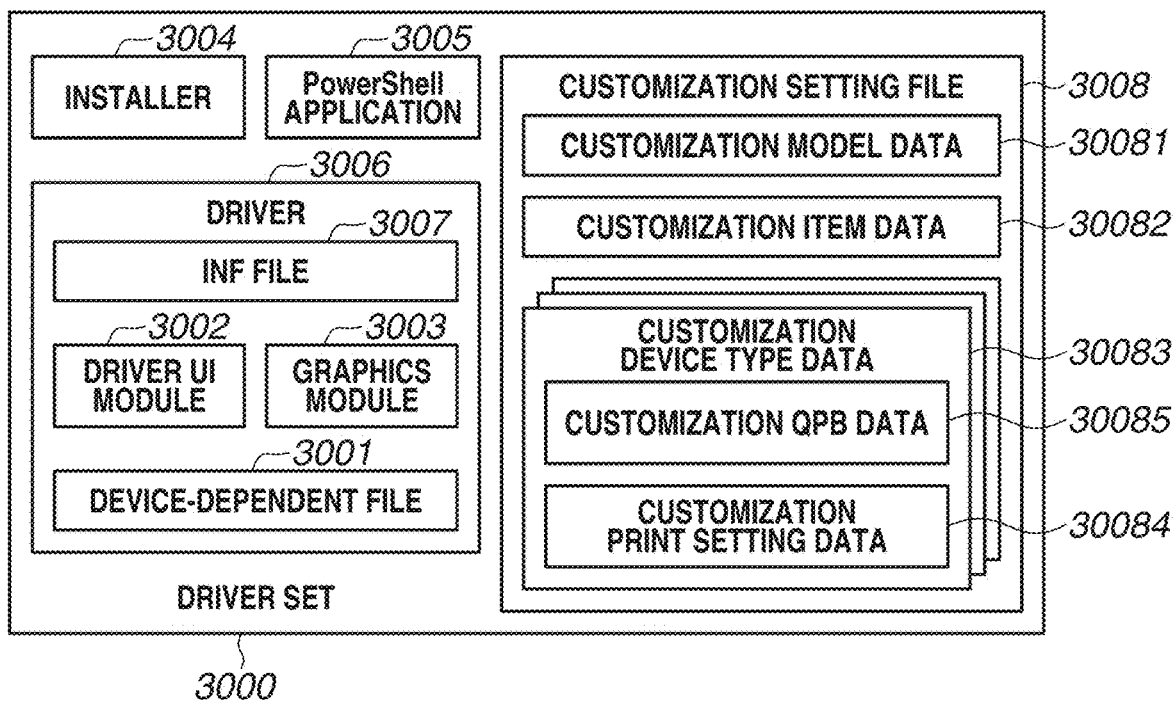
Figure 3C:
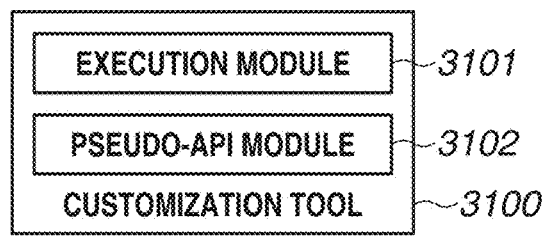

A general configuration of a customization tool will be described with reference to FIGS. 3A, 3B, and 3C. First, a driver set will be described with reference to FIG. 3A. A driver set 3000 is a driver set described in the present exemplary embodiment. The driver set 3000 is a group of files and modules of the driver 3006 necessary for installing the driver 3006 in the OS 210. The driver 3006 includes a module such as a rendering module and a group of device-dependent files, which are necessary when printing is executed. A file 3001 is a device-dependent file. The device-dependent file 3001 includes a group of files about a list of prohibition rules or functions of each device type, and a value of the print setting specified at the time of factory shipment or a default print setting at each locale. A module 3002 is a driver UI module. After the driver 3006 is installed in the OS 210, the driver UI module 3002 is called at the time of printing operation to allow a user to easily change the print setting. Further, even before the driver 3006 is installed in the OS 210, the driver UI module 3002 can be loaded and called through another application 212. A graphic module 3003 converts a file as a printing target into a file described in page description language (PDL) when the driver 3006 executes printing. Setting information such as a list of device types supported by the driver set 3000 or a list of modules necessary for a printer driver of a supported device type is described in an INF file 3007. An installer 3004 installs the driver 3006 in the OS 210 when the installer 3004 is externally activated through the operation input device 205. When a PowerShell application 3005 is activated through the operation input device 205 or another application 212, the PowerShell application 3005 can call an application programming interface (API) of the PowerShell. The PowerShell is a command line-based extensible script language included in Windows (registered trademark), and various APIs within the OS 210 can be called thereby on a command line basis.

A customized driver set will be described with reference to FIG. 3B. The customized driver set includes a customization setting file (customization information) in addition to the constituent elements of the driver set 3000 in FIG. 3A. Therefore, description will be omitted with respect to the constituent elements of the reference numerals already illustrated in FIG. 3A.

A file 3008 is a customization setting file. The customization setting file 3008 is written into a position accessible by the driver 3006 when installation is executed, and used for changing a setting of the driver 3006 to a customized setting immediately after the driver 3006 is installed.

The customization setting file 3008 includes customization model data 30081, customization item data 30082, and customization device type data 30083. The customization model data 30081 is data about a list of installation target printer models to be installed through the customized driver set. A user of the customized driver set can only install a printer model optionally selected by a preparer of the customized driver set.

A printer model in a standard setting which is not customized is also included in the printer models selected as the installation targets.

The customization item data 30082 is data about a version number of the customized driver set or a version number of a customization tool 3100 that has generated the customized driver set. The customization device type data 30083 is a folder in which information necessary for executing customization for each printer model is stored, and the customization device type data 30083 is generated for each customized printer model.

Accordingly, even if a printer model is the installation target of the customized driver set, the customization device type data 30083 is not generated for the printer model that is not customized.

The customization device type data 30083 includes data for customizing the driver 3006 such as customization print setting data 30084 and customization queue property bag (QPB) data 30085. The customization print setting data 30084 is information for customizing a print setting. The customization QPB data 30085 is information for customizing a device setting or an administrator setting.

Details of the data within the customization setting file 3008 will be described below.

The customization tool 3100 will be described with reference to FIG. 3C. The customization tool 3100 generates the customization setting file 3008 based on the driver set 3000.

An execution module 3101 of the customization tool 3100 displays a UI of the customization tool 3100.

A pseudo-API module 3102 is a pseudo-API for generating the customization setting file 3008. Normally, the driver UI module 3002 is called from the OS 210 to perform operations. Then, the driver UI module 3002 realizes various functions by using an operating system application programming interface (OSAPI) 5004. The execution module 3101 directly calls and uses the driver UI module 3002 before the driver UI module 3002 is installed in the OS 210. Therefore, the driver UI module 3002 cannot use the OSAPI 5004. Therefore, the driver UI module 3002 uses the pseudo-API module 3102 as an API substitute for the OSAPI 5004.

The customization setting file 3008 will be described with reference to FIGS. 4A, 4B, 4C, and 4D.

FIG. 4A is a diagram illustrating an example of the customization model data 30081 described in markup description language. The customization model data 30081 includes a Properties element, and the Properties element includes one or more PrinterModel elements. Data 400 is the PrinterModel element. The PrinterModel element 400 includes a Customized element and PrefixString element as sub-elements. A Customized element 401 indicates whether the PrinterModel element 400 as a main-element can be installed by the customized driver set. If the Customized element 401 is "ON", this indicates that installation is executable. If the Customized element 401 is "OFF", this indicates that installation is not executable. Information uniquely specifying a printer model is input to printer model identifier information 402. The printer model identifier information 402 is used as a name when the customization device type data 30083 is generated.

FIG. 4B illustrates an example of the customization item data 30082. The customization item data 30082 is described in markup description language having a plurality of Feature elements, and each of the Feature elements includes "Name" as an attribute serving as an identifier of each of the Feature elements. Further, the Feature element includes a Value element as a sub-element, and information is described in the Value element of the Feature element.

Data 410 is an example of data describing a customization code. The customization code 410 is information illustrating description or an identifier of the customized driver. Data 411 is an example of data describing version information about the customized driver set. Data 412 describes a name of the customization tool 3100. Data 413 describes version information about the customization tool 3100.

FIG. 4C illustrates an example of the customization print setting data 30084 as a piece of information stored in the customization device type data 30083. The customization print setting data 30084 is generated in a markup description language format, and includes difference data acquired by comparing a value of the print setting with a value of the print setting of the driver set 3000 specified at the time of factory shipment. Data 420 is an example of data for changing a value of a default print setting set to the driver 3006, which is specified as "color" at the time of factory shipment, to "monochrome". Hereinafter, a default print setting after customization is called as "customized default". The customization print setting data 30084 is generated by a combination of the Feature element and the Option element, and the Feature element is regarded as a main-element with respect to the Option element in the markup description language. The Feature element represents a function, whereas the Option element represents a setting selected with respect to the function. In this example, "psk:Monochrom" is set with respect to "psk:PageOutputColor".

FIG. 4D illustrates an example of the customization QPB data 30085 as a piece of information stored in the customization device type data 30083. The customization QPB data 30085 includes Property elements. In the Property elements, all of item data of queue information described in the device-dependent file 3001 are generated. Data 430 is an example of an item of the queue information. The queue information 430 has a Name attribute, and is used as an identifier of the Property element. The queue information is setting data for both of a device setting and an administrator setting of the print queue (hereinafter, also simply called as "queue"), and output in one markup description language. If there is no information to be input with respect to the item, the queue information 430 is output with a blank space.

Data 431 is an example of a setting value of a device setting which describes that a cassette is set thereto.

FIG. 5 is a block diagram illustrating configurations of the OS 210, the driver 3006, and the print setting application 5000. First, an operation of the print setting application 5000 as one of the applications 212 will be described with reference to FIG. 5. Description will be omitted with respect to the constituent elements of the reference numerals already illustrated in the above.

When the user activates the print setting application 5000, the print setting application 5000 loads the driver UI module 3002 of the driver 3006 to display a print setting UI. When the print setting UI is displayed, the print setting application 5000 refers to the default setting storage portion 5001 in which the device-dependent file 3001 or a default print setting set by the user is stored. Then, the print setting application 5000 acquires print setting information such as "PrintTicket" or "PrintCapabilities" generated by the OS 210. Further, the print setting application 5000 acquires driver information such as a value of the print setting specified at the time of factory shipment from the driver information storage portion 5008. Furthermore, the print setting application 5000 acquires user information such as a favorite or a stamp generated by the user from the user information storage portion 5006 including a registry and a user property bag (UPB). There is a queue information storage portion 5002 as an area of a registry database at each print queue (logical printer). A part of the queue information storage portion 5002 is also called as a queue property bag (QPB). The print setting application 5000 acquires the customization setting file 3008 and various information such as the device setting information and the administrator setting information from the QPB and displays the print setting UI. The print setting application 5000 acquires, through the OSAPI 5004, the print setting information, the driver information, the user information, the customization setting file 3008, the device information, and the administrator setting information.

A constituent element which has not been described from among the constituent elements in FIG. 5 will be described.

A primary file decompression portion 5003 is a module included in the OS 210. The primary file decompression portion 5003 is used for temporarily decompressing a compressed file when the driver set 3000 is compressed with a cab file, or used for temporarily generating a file to be used when the application 212 is activated. The OS API 5004 is an API group provided from the OS 210, which is used for acquiring the print setting.

A driver storage 5005 is a folder in which the driver 3006 managed by the OS 210 is placed, so that the driver 3006 is placed in the driver storage 5005 when installed.

Installation of the customized driver set will be described with reference to FIGS. 7, 10A, 10B, 10C, 10D, 11A, 11B, and 11C. In step S7001, the installer 3004 displays a language setting screen 10000 illustrated in FIG. 10A. After the installer 3004 displays the language setting screen 10000, the installer 3004 accepts an operation from the user through the operation input device 205. After the installer 3004 accepts the operation, when the user changes a language setting 1001, the installer 3004 switches the display language to the selected language when the installer 3004 displays an optional screen next time. In step S7002, the installer 3004 displays a license agreement screen 10100 illustrated in FIG. 10B when an operation to a NEXT button 10002 is input through the user operation performed on the operation input device 205. The installer 3004 displays a license agreement in an area 10101 of the license agreement screen 10100.

In step S7003, when the installer 3004 accepts an operation to the NEXT button 10102 on the license agreement screen 10100, the installer 3004 reads a file within the driver set. After the installer 3004 reads the file, in step S7004, the installer 3004 displays an installation method selection screen 10200 illustrated in FIG. 10C. On the installation method selection screen 10200, the user can select an installation method from a plurality of installation methods. A standard setup installation 10201 is a method of searching for and installing a device connected to the network.

A customized setup installation 10202 is a method of executing installation in a state where there is no device. In a USB connection setup installation 10203, the client computer 101 is connected to a USB when installation is executed, and the OS 210 searches for and installs the driver 3006 conforming to a hardware identification (HWID) of a device through a plug-and-play function. In the present exemplary embodiment, the standard setup installation as a typical installation method will be described.

When the installer 3004 accepts an operation to a NEXT button 10204 in a state where the standard setup installation 10201 is selected, the installer 3004 searches for the printer 102 connected to the network 103. Then, in step S7005, the installer 3004 displays a list of printers 102 on a printer selection screen 10300 illustrated in FIG. 10D. On the printer selection screen 10300 in FIG. 10D, the installer 3004 displays a list of printers in a printer list box 10301, and displays a device name, a product name, an internet protocol (IP) address, and a media access control (MAC) address as the items in the printer list box 10301. Further, immediately after the installer 3004 displays the printer selection screen 10300, the installer 3004 displays a NEXT button 1030 in a gray-out state, and each of the items has a checkbox. When the installer 3004 accepts an operation from the user through the operation input device 205, a checkbox is ticked and the item is selected. When the checkbox is ticked, the NEXT button 10303 is released from the gray-out state and enabled. When the user selects the NEXT button 10303, in step S7006, the installer 3004 displays an installation confirmation screen 11300 illustrated in FIG. 11A. The installer 3004 displays a printer name, a driver name, and a port of the driver 3006 to be installed in an area 11301 of the installation confirmation screen 11300. When the standard setup installation 10201 is selected, the installer 3004 displays an IP address of the printer as the port. When a NEXT button 11302 is pressed on the installation confirmation screen 11300, in step S7007, the installer 3004 internally generates an installation target list and executes installation processing after displaying a progress screen 11400 illustrated in FIG. 11B. The installation processing will be described below. In step S7008, after the installation processing is completed, the installer 3004 displays a screen 11500 indicating ending of installation of the customized driver set illustrated in FIG. 11C. Then, the processing is completed when an END button 11501 is pressed.

The installation processing of the driver 3006 as an installation target will be described with reference to a flowchart in FIG. 8. The application and the module are stored in the external memory 209, loaded on the RAM 202 as necessary, and executed by the CPU 201 of the client computer 101.

First, in step S8001, the installer 3004 stores the driver 3006 in the driver storage 5005 as a predetermined folder managed by the OS 210. The installer 3004 executes this storing processing by using a function of the OS 210. Through the loop processing in steps S8002 to S8009, the installer 3004 executes the installation processing of the driver 3006 to each of the printers listed in the installation target list. In step S8002, the installer 3004 confirms whether a printer on which the installation processing has not been performed (hereinafter referred to as an unprocessed printer) is included in the installation target list. As a result of the confirmation, if the unprocessed printer is included in the installation target list (YES in step S8002), the processing proceeds to step S8003. In step S8003, the installer 3004 acquires one unprocessed printer from the installation target list and specifies the one unprocessed printer as a current installation target. In step S8004, in order to figure out the printer driver already installed in the OS 210, the installer 3004 acquires a printer list generated before the printer driver as a current installation target is installed. The printer list is a list of print queues included in the OS 210. In step S8005, based on the information about the IP address of the installation target, the installer 3004 requests the OS 210 to generate a port in the OS 210. In step S8006, the installer 3004 specifies a printer name for managing a print job with respect to the driver 3006 and requests the OS 210 to generate a queue 5007 corresponding to the driver 3006. At this time, the queue information storage portion 5002 is generated. Lastly, in step S8007, the installer 3004 requests the OS 210 to associate the driver 3006 with the queue 5007 and the port. In step S8008, after executing the installation processing, the installer 3004 writes a user-default print setting into the default setting storage portion 5001. Thereafter, in step S8009, the installer 3004 executes customization setting file writing processing. The customization setting file writing processing will be described below. If the driver 3006 is installed in all of devices listed in the installation target list, the installation processing is completed.

Figure 8:
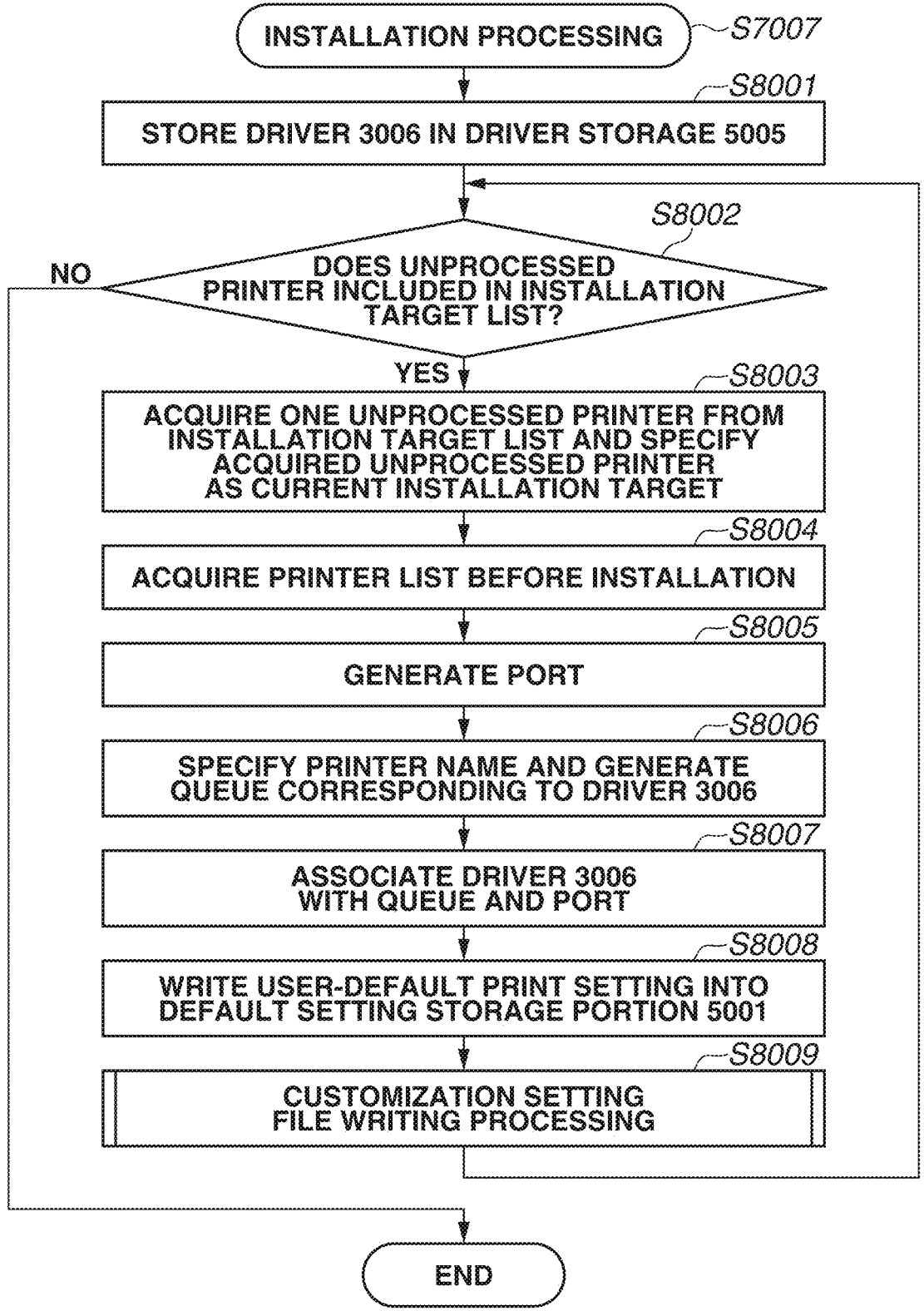
FIG. 8 is a flowchart illustrating installation processing of a customized driver.

Through the processing in FIG. 8, a printer driver can be installed by specifying a name of a logical printer (i.e., printer name).

Figure 9:
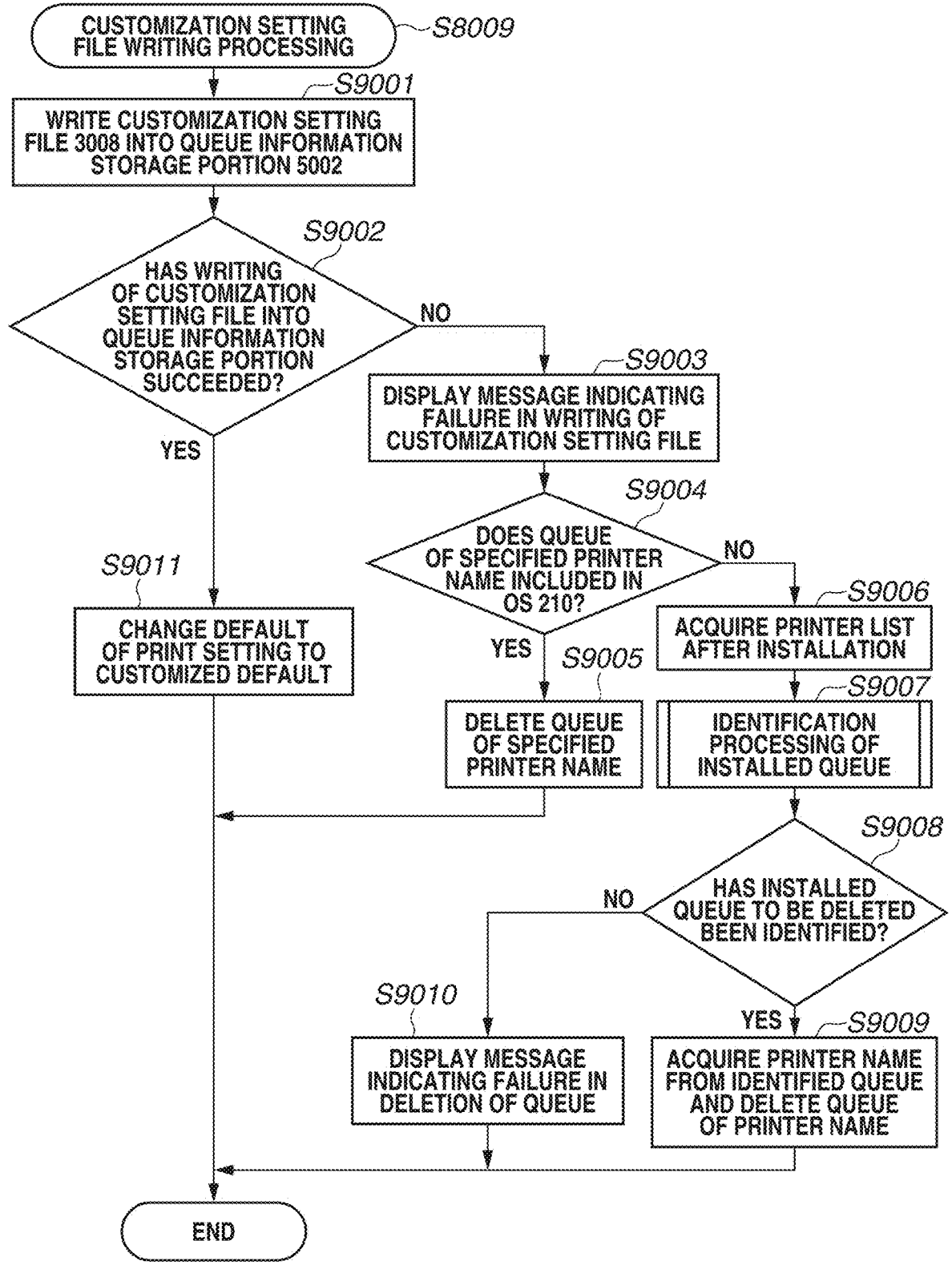
FIG. 9 is a flowchart illustrating writing processing of a customization setting file.
Figure 10A:
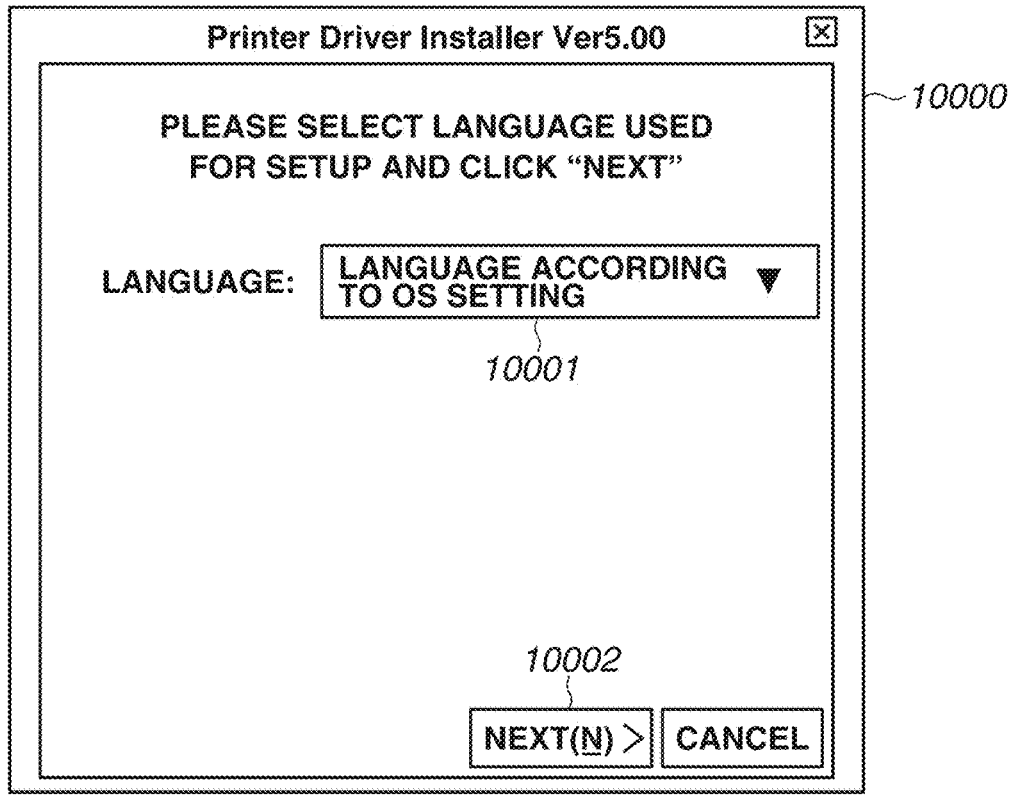
FIGS. 10A, 10B, 10C, and 10D are diagrams schematically illustrating setting screens of an installer.
Figure 10B:
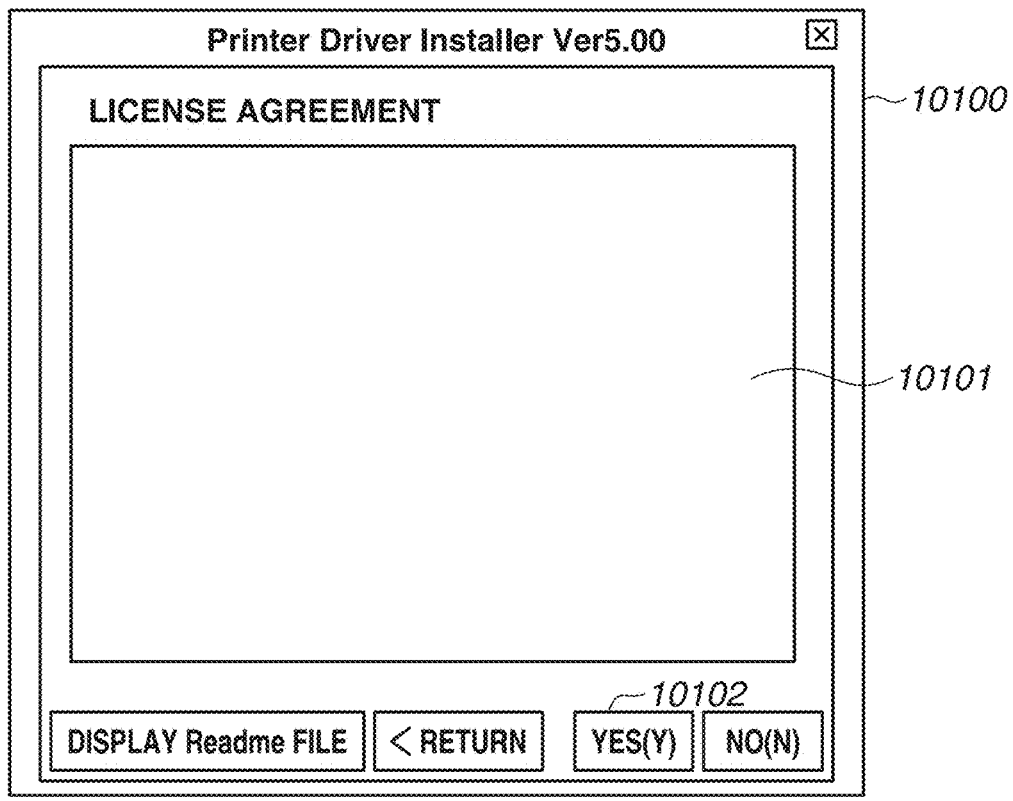
Figure 10C:
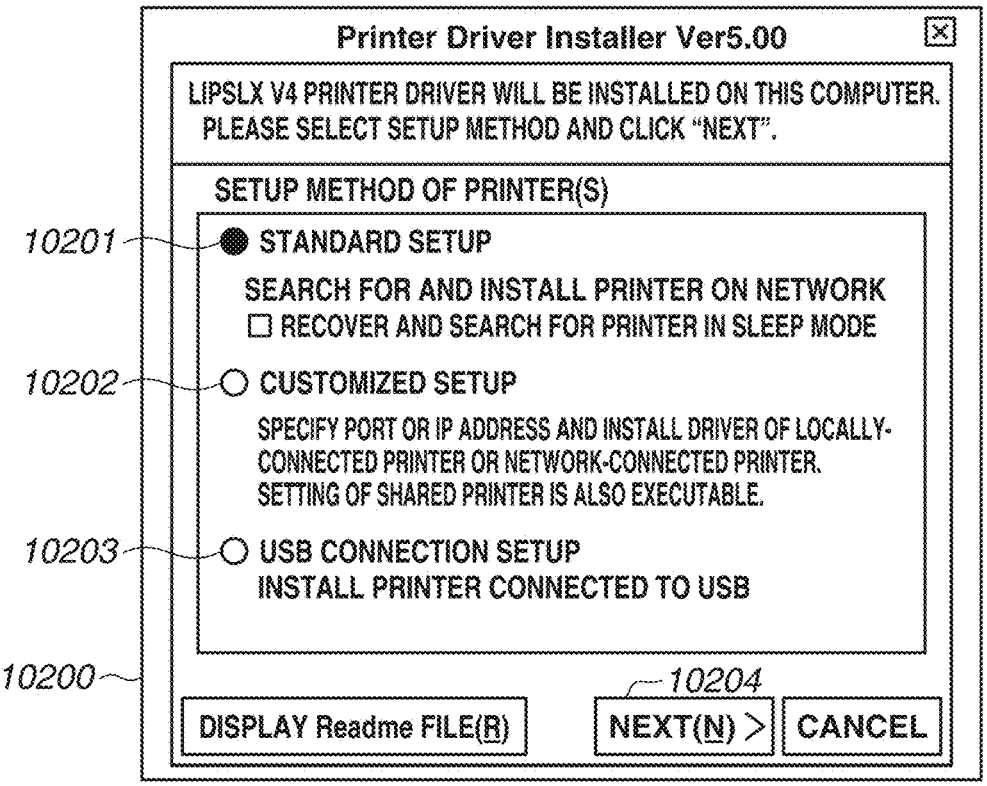
Figure 10D:
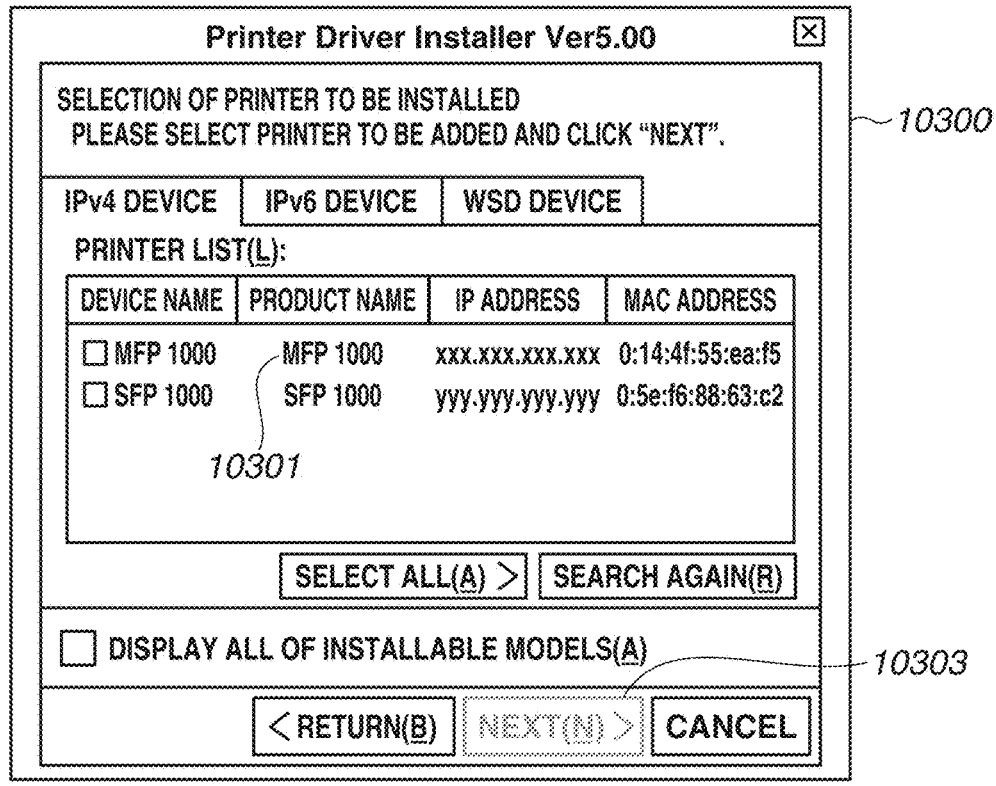
Figure 11A:
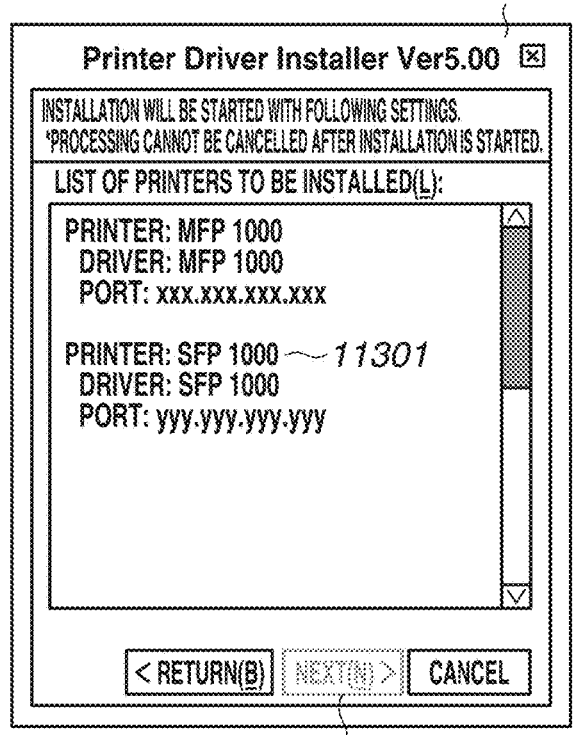
FIGS. 11A, 11B, and 11C are diagrams schematically illustrating setting screens of the installer.
Figure 11C:
Figure 11B:
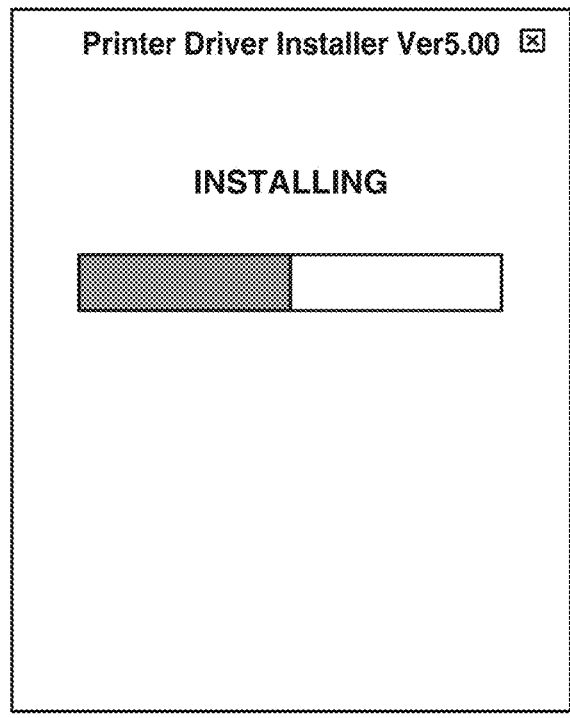

The writing processing of the customization setting file 3008 will be described with reference to FIG. 9.

The application and the module are stored in the external memory 209, loaded on the RAM 202 as necessary, and executed by the CPU 201 of the client computer 101.

First, in step S9001, the installer 3004 tries to access the OSAPI 5004 and writes the customization setting file 3008 into the queue information storage portion 5002 corresponding to the target print queue. With this processing, the customization setting file 3008 is applied to the logical printer, and the customization information for changing a setting of the printer driver is added to the database.

The OSAPI 5004 transmits a result of the writing processing to the installer 3004. By receiving the result, in step S9002, the installer 3004 confirms whether writing of the customization setting file 3008 in the queue information storage portion 5002 has succeeded. With this processing, it is possible to determine whether adding of the customization information to the database has succeeded with respect to the logical printer. In addition, after the installer 3004 executes the writing processing, the installer 3004 may acquire information from the queue information storage portion 5002 to execute verification processing for verifying whether the customization setting file 3008 has been correctly written, and may determine whether the writing processing has succeeded through the verification processing.

If the writing processing has succeeded (YES in step S9002), the processing proceeds to step S9011. In step S9011, the installer 3004 uses the OSAPI 5004 to change a default of the print setting to the customized default. Then, the customization setting file writing processing is ended. If the writing processing has failed, and an exceptional instance has occurred (NO in step S9002), the processing proceeds to step S9003.

Figure 19A:
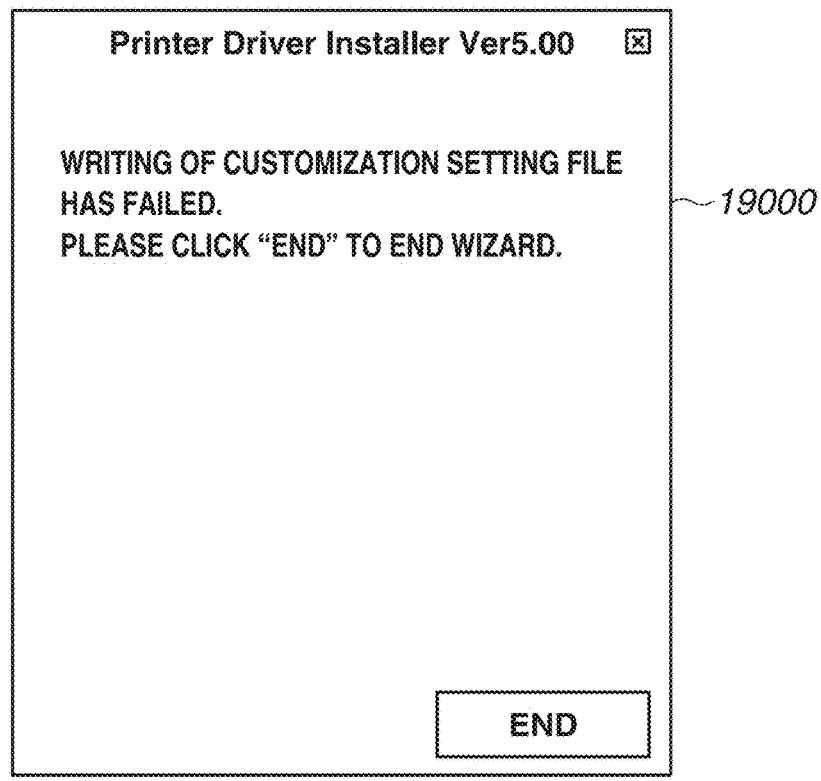
FIGS. 19A and 19B are diagrams schematically illustrating screens for displaying messages about a failure in customization setting.

In step S9003, the installer 3004 displays a message indicating a failure in writing of the customization setting file 3008. For example, the installer 3004 displays a screen 19000 illustrated in FIG. 19A. In addition, the installer 3004 may display the message after the processing in step S9005 or S9009 instead of displaying the message in step S9003. In step S9004, the installer 3004 confirms whether a queue of the printer name specified in step S8006 is included in the OS 210. If the queue is included in the OS 210 (YES in step S9004), the processing proceeds to step S9005. In step S9005, the installer 3004 deletes the queue of the printer name specified in step S8006.

Through the above processing, if the installer 3004 determines that adding of the customization information to the database has failed with respect to the logical printer and that the logical printer of the specified name is included in the OS 210, the installer 3004 deletes the logical printer of the specified name from the OS 210.

Figure 19B:
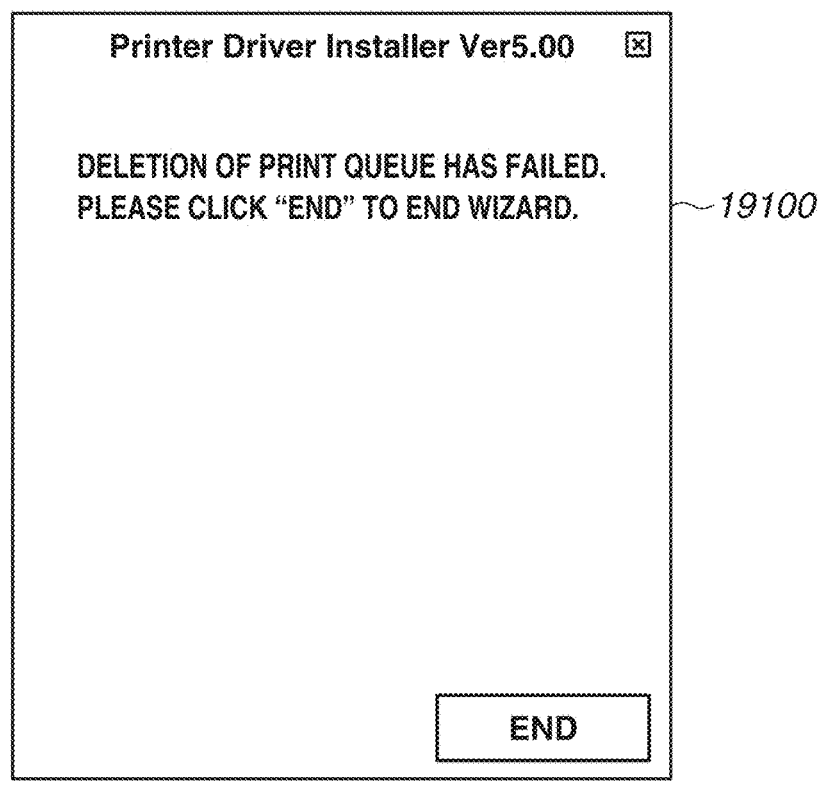

If the queue is not included in the OS 210 (NO in step S9004), the processing proceeds to step S9006. In step S9006, the installer 3004 acquires a printer list after installation. In step S9007, the installer 3004 executes identification processing of identifying the installed queue. The identification processing of identifying the installed queue will be described below. After executing the identification processing of identifying the installed queue, in step S9008, the installer 3004 confirms whether the installed queue to be deleted is identified. If the queue is identified (YES in step S9008), the processing proceeds to step S9009. In step S9009, the installer 3004 acquires a printer name from the identified queue and deletes the queue of the printer name. Then, the customization setting file writing processing is ended. If the queue is not identifiable (NO in step S9008), the processing proceeds to step S9010. In step S9010, the installer 3004 displays a message indicating a failure in deletion of the queue. For example, the installer 3004 displays a screen 19100 illustrated in FIG. 19B. Then, the customization setting file writing processing is ended.

Figure 6:
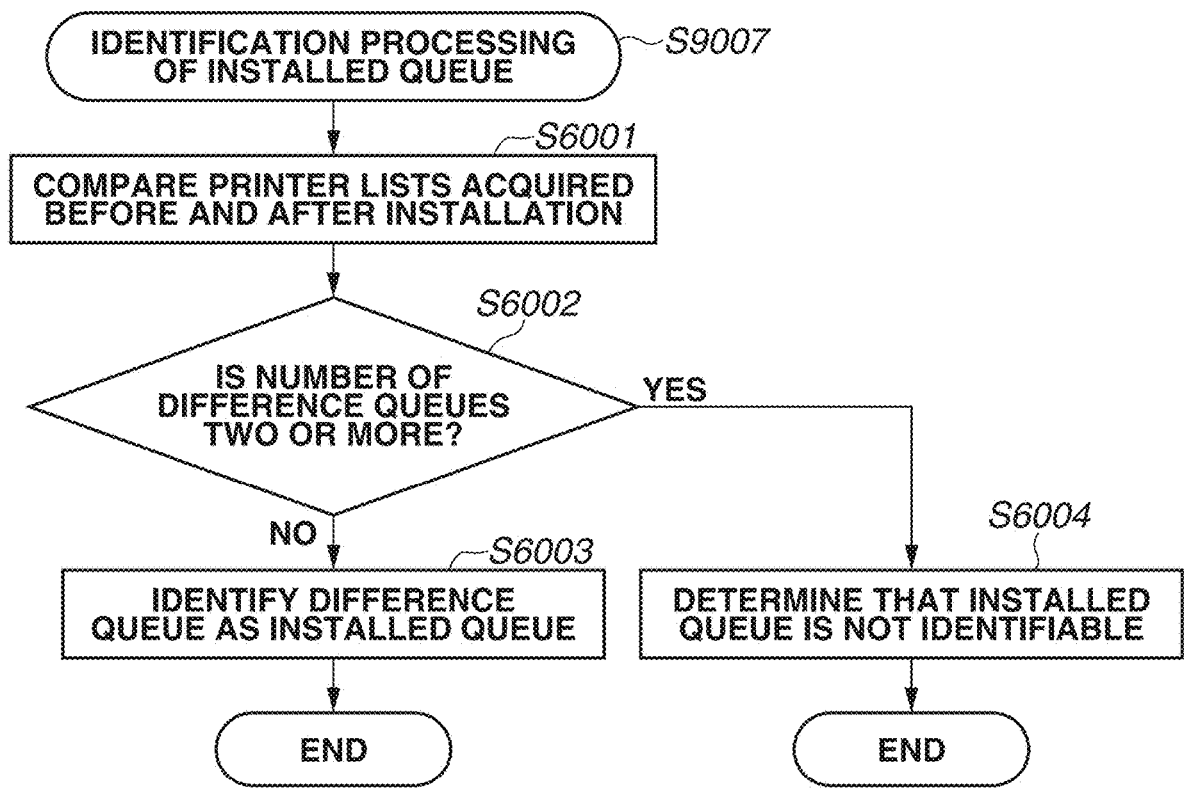
FIG. 6 is a flowchart illustrating identification processing of an installed queue.
Figure 7:
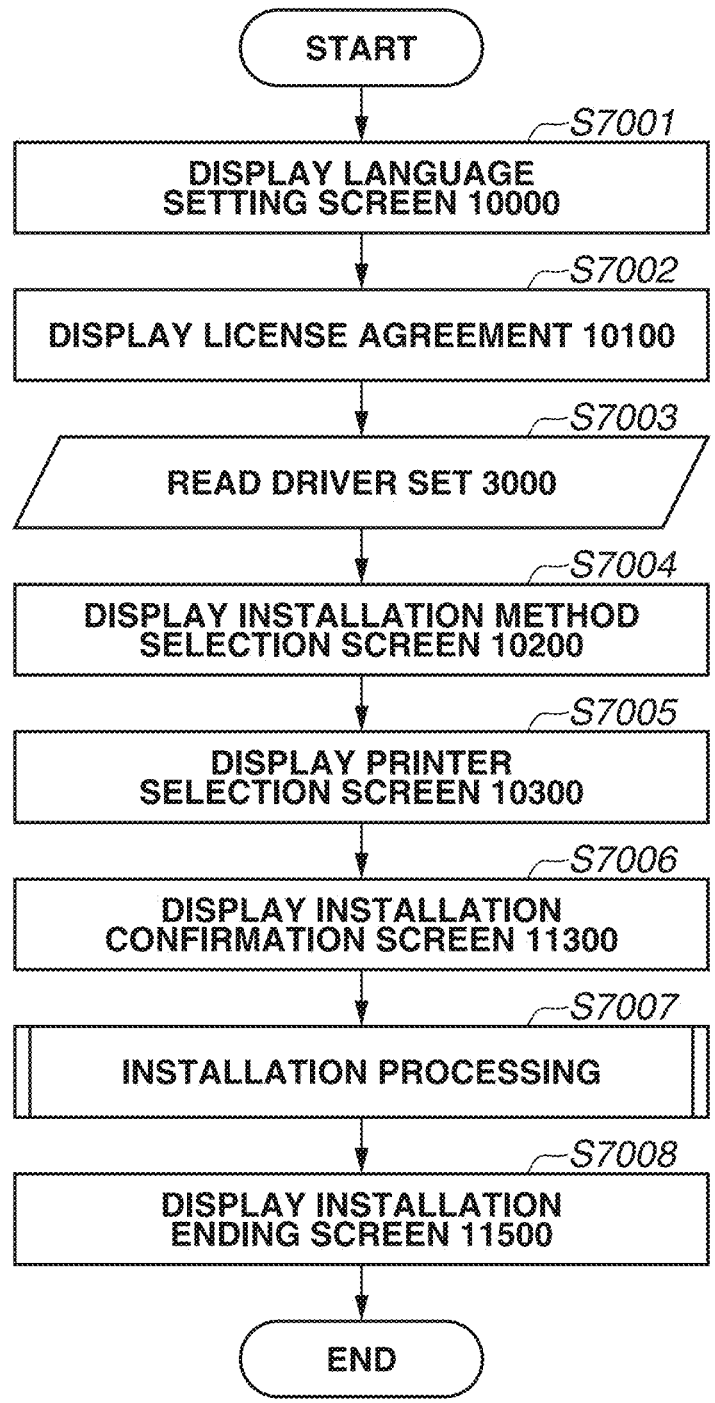
FIG. 7 is a flowchart illustrating installation processing of a customized driver.

Processing of identifying the installed queue from the printer list will be described with reference to FIG. 6. There is a case where the user changes a name of the installed queue during a period between a time when the queue is generated in step S8006 and a time when the installer 3004 confirms whether the queue of the printer name is included in the OS 210 in step S9004. In such a case, the installer 3004 cannot delete the queue of the printer name specified in step S8006, so that the installer 3004 needs to execute the processing of identifying the installed queue in FIG. 6. The application and the module are stored in the external memory 209, loaded on the RAM 202 as necessary, and executed by the CPU 201 of the client computer 101.

First, in step S6001, the installer 3004 compares the printer list acquired before installation and acquired in step S8004 with the printer list acquired after installation and acquired in step S9006. In step S6002, based on the comparison between the lists, the installer 3004 confirms whether a number of difference queues is two or more. If the number of difference queues is one (NO in step S6002), the processing proceeds to step S6003. In step S6003, the installer 3004 identifies the difference queue as the installed queue. If the number of difference queues is two or more (YES in step S6002), the processing proceeds to step S6004. In step S6004, the installer 3004 determines that the installed queue is not identifiable.

Through the above processing, the installer 3004 determines whether the logical printer to be deleted is included in the OS 210 based on the printer lists (lists of logical printers) acquired before and after installation of the printer driver. Then, if the installer 3004 determines that adding of the customization information to the database has failed with respect to the logical printer and that the logical printer to be deleted from the printer list is included in the OS 210, the installer 3004 can delete, from the OS 210, the logical printer to be deleted.

According to the present exemplary embodiment, the installer 3004 deletes a print queue of the customized driver in a case where writing of the customization information has failed, so that it is possible to prevent an erroneous operation or an unexpected operation due to the driver being operated according to incomplete information.

In a case where the installer 3004 cannot execute setting of the customization information, the installer 3004 compares the printer lists acquired before and after installation with each other. Then, the installer 3004 can identify the print queue for which the customization setting has failed, and can surely delete the print queue by specifying the printer name. Further, it is possible to prevent an erroneous operation or an unexpected operation due to the driver being operated according to incomplete information.

A second exemplary embodiment will be described. In the first exemplary embodiment, when the installer 3004 cannot execute setting of the customization information, the installer 3004 compares printer lists acquired before and after installation with each other, and identifies a logical printer for which the customization setting has failed. In the present exemplary embodiment, processing of narrowing down the installed queues, which is executed when the print queue is not identifiable only with the difference between the printer lists, will be described.

Figure 12:
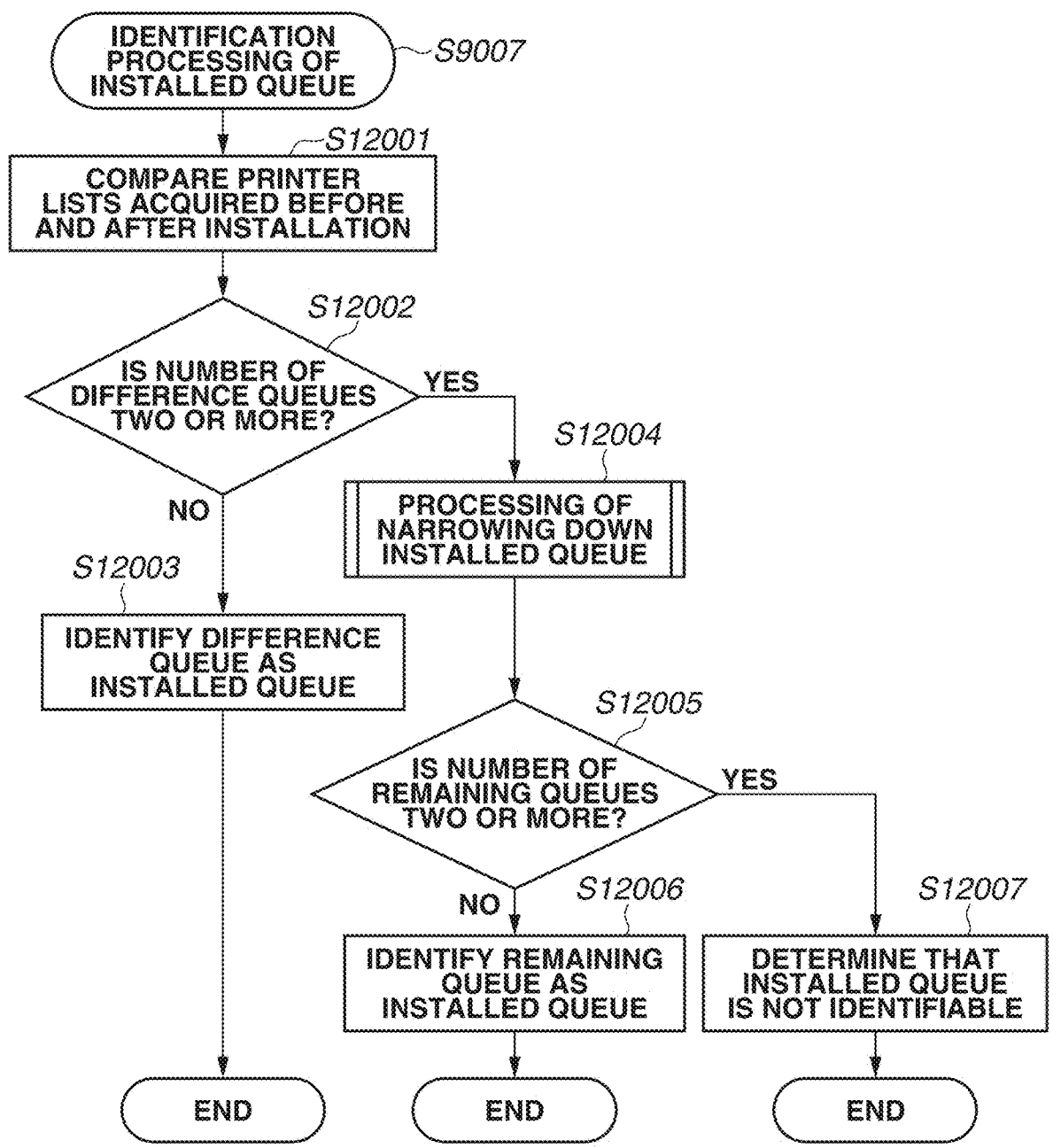
FIG. 12 is a flowchart illustrating identification processing of an installed queue.

The installation processing and the customization setting file writing processing are similar to those described in the first exemplary embodiment. The present exemplary embodiment is different in the identification processing of an installed queue in step S9007 of FIG. 9. A method of narrowing down the installed queues by using another information in the identification processing of the installed queue will be described with reference to FIG. 12. The application and the module are stored in the external memory 209, loaded on the RAM 202 as necessary, and executed by the CPU 201 of the client computer 101.

First, in step S12001, the installer 3004 compares the printer list acquired before installation and acquired in step S8004 with the printer list acquired after installation and acquired in step S9006. In step S12002, based on the comparison between the lists, the installer 3004 confirms whether a number of difference queues is two or more. If the number of difference queues is one (NO in step S12002), the processing proceeds to step S12003. In step S12003, the installer 3004 identifies the difference queue as the installed queue. If the number of difference queues is two or more (YES in step S12002), the processing proceeds to step S12004. In step S12004, the installer 3004 further executes processing of narrowing down the installed queues. The processing of narrowing down the installed queues will be described below. After the installer 3004 executes the processing of narrowing down the installed queues, in step S12005, the installer 3004 also confirms whether a number of remaining queues is two or more. If the number of remaining queues is one (NO in step S12005), the processing proceeds to step S12006. In step S12006, the installer 3004 identifies the remaining queue as the installed queue. If the number of remaining queues is two or more (YES in step S12005), the processing proceeds to step S12007. In step S12007, the installer 3004 determines that the installed queue is not identifiable.

Figure 14:
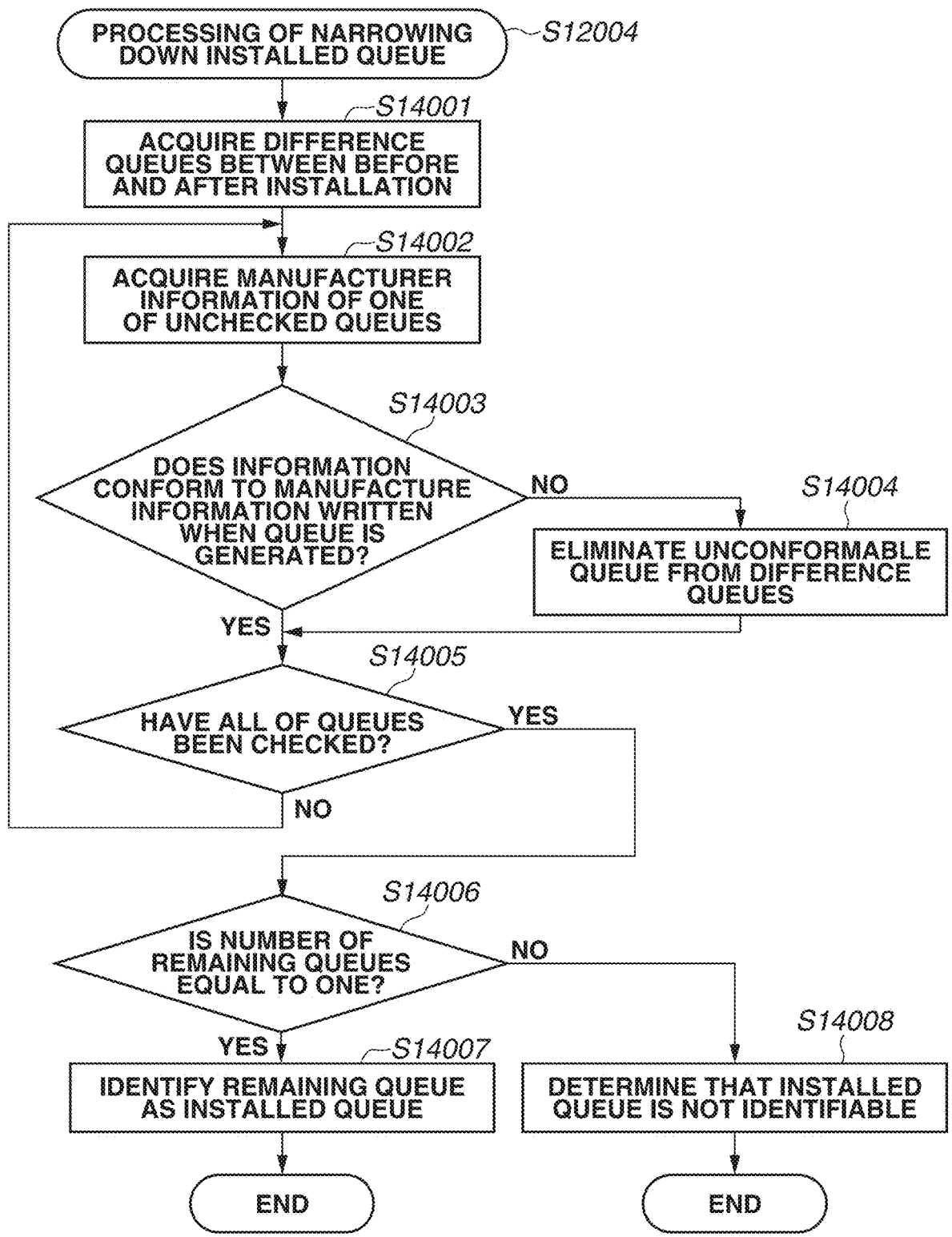
FIG. 14 is a flowchart illustrating narrowing-down processing of an installed queue.

A method of narrowing down the installed queues by using the information about a manufacturer who manufactures the printer written in the queue will be described with reference to FIG. 14. The application and the module are stored in the external memory 209, loaded on the RAM 202 as necessary, and executed by the CPU 201 of the client computer 101.

In step S14001, based on the printer lists acquired before and after installation and acquired in steps S8004 and S9006, the installer 3004 acquires a difference queue between queues before and after installation. As it is determined in step S12002 that the number of difference queues is two or more, the installer 3004 acquires the manufacturer information of one unchecked queue from among the difference queues. Then, in step S14003, the installer 3004 confirms whether the acquired manufacture information conforms to manufacture information that is written when the queue is generated. If the manufacture information does not conform to each other (NO in step S14003), the processing proceeds to step S14004. In step S14004, the installer 3004 eliminates the unconformable queue from the difference queues. If the manufacture information conforms to each other (YES in step S14003), the installer 3004 leaves the queue as it is, and the processing proceeds to step S14005. In step S14005, the installer 3004 confirms whether all of the queues have been checked. If not all of the queues have been checked (NO in step S14005), the processing is repeatedly executed from step S14002. If all of the queues have been checked (YES in step S14005), the processing proceeds to step S14006. In step S14006, the installer 3004 confirms whether a number of remaining queues is one. If a number of remaining queues is one (YES in step S14006), the processing proceeds to step S14007. In step S14007, the installer 3004 identifies the one remaining queue as the installed queue. Then, the processing of narrowing down the installed queues is ended. If a number of remaining queues is not one (NO in step S14006), the processing proceeds to step S14008. In step S14008, the installer 3004 determines that the installed queue is not identifiable. Then, the processing of narrowing down the installed queues is ended.

In the present exemplary embodiment, although the installer 3004 narrows down the installed queues by acquiring the manufacture information, it is obvious that the installer 3004 can narrow down the queues similarly by acquiring another information.

As described above, in a case where the installer 3004 cannot execute setting of the customization information, the installer 3004 acquires a difference between the printer lists before and after installation. Then, by further acquiring the manufacturer information about the print queues, the installer 3004 can narrow down the installed queues, identify the print queue for which the customization setting has failed, and surely delete the print queue by specifying the printer name. Therefore, it is possible to prevent an erroneous operation or an unexpected operation due to the driver being operated according to incomplete information.

A third exemplary embodiment will be described. In the second exemplary embodiment, in a case where the installer 3004 cannot execute setting of the customization information and the installer 3004 cannot identify the print queue only with a difference between the printer lists, the installer 3004 identifies a logical printer by further narrowing down the installed queues. In the present exemplary embodiment, the installer 3004 identifies the installed queue by using information directly specified when the queue is generated.

Figure 13:
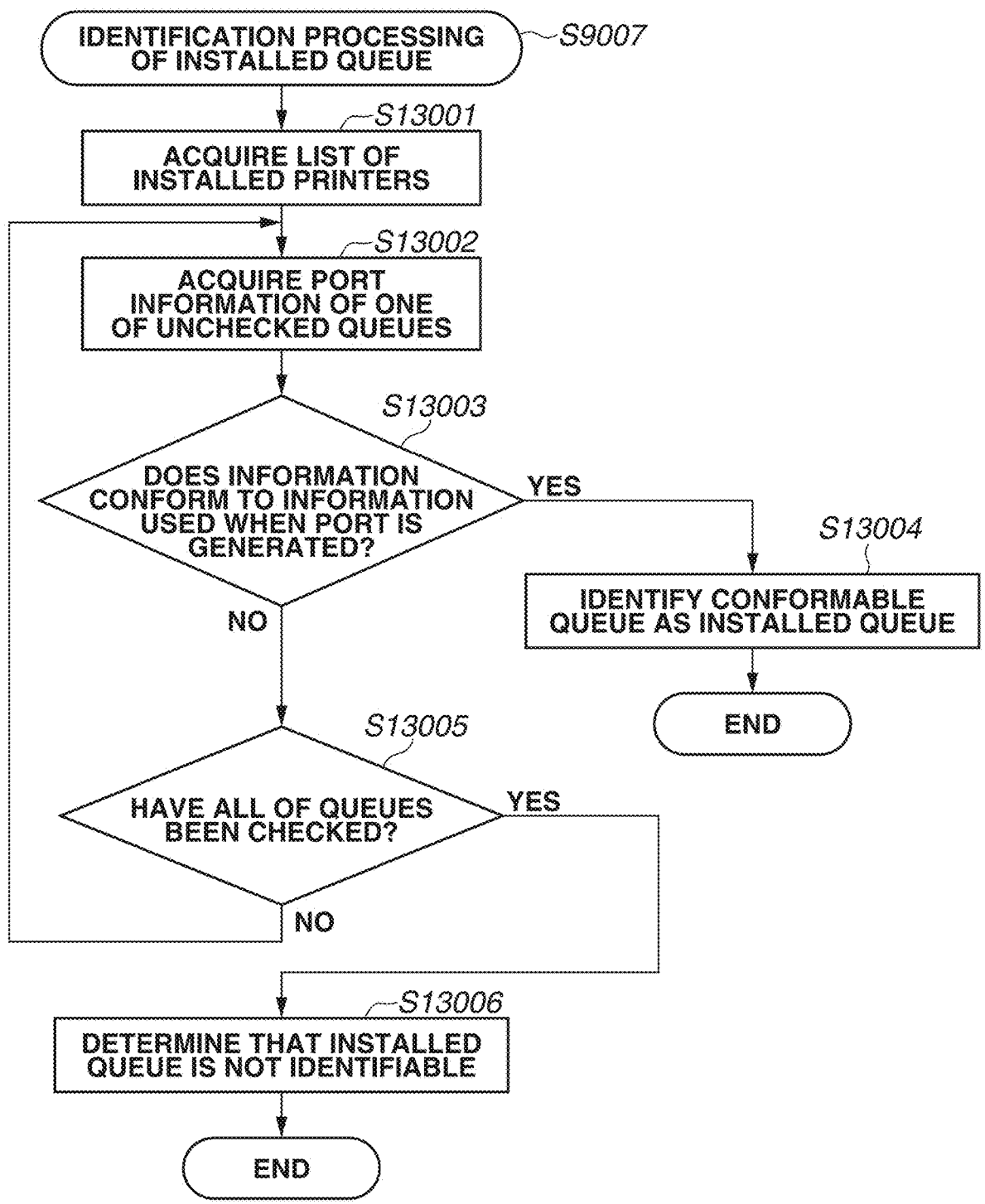
FIG. 13 is a flowchart illustrating identification processing of an installed queue.

The installation processing and the customization setting file writing processing are similar to those described in the first exemplary embodiment. The present exemplary embodiment is different in the identification processing of the installed queue in step S9007 of FIG. 9. The identification processing of the installed queue will be described with reference to FIG. 13. The application and the module are stored in the external memory 209, loaded on the RAM 202 as necessary, and executed by the CPU 201 of the client computer 101.

First, in step S13001, the installer 3004 acquires a list of installed printers. In step S13002, from the printer list, the installer 3004 acquires information (port information) relating to a port associated with one of the unchecked queues. Then, in step S13003, the installer 3004 confirms whether the acquired information conforms to the information used when the port is generated in step S8005. For example, the installer 3004 may confirm the information about an IP address. If the information conforms to each other (YES in step S13003), the processing proceeds to step S13004. In step S13004, the installer 3004 identifies the conformable queue as the installed queue. Then, the identification processing of the installed queue is ended. If the information does not conform to each other (NO in step S13003), the processing proceeds to step S13005. In step S13005, the installer 3004 confirms whether all of the queues have been checked. If not all of the queues have been checked (NO in step S13005), the processing is repeatedly executed from step S13002. If all of the queues have been checked (YES in step S13005), the processing proceeds to step S13006. In step S13006, the installer 3004 determines that the installed queue is not identifiable because there is no conformable queue. Then, the identification processing of the installed queue is ended.

As described above, in a case where the installer 3004 cannot execute setting of the customization information, the installer 3004 identifies the installed queue by using the information directly specified when the queue is generated. Then, the installer 3004 identifies the print queue for which the customization setting has failed, so that the installer 3004 can surely delete the print queue by specifying the printer name. Therefore, it is possible to prevent an erroneous operation or an unexpected operation due to the driver being operated according to incomplete information.

A fourth exemplary embodiment will be described. In the third exemplary embodiment, in a case where the installer 3004 cannot execute setting of the customization information, the installer 3004 executes identification of the installed logical printer by using the information directly specified when the print queue is generated. In the present exemplary embodiment and a fifth exemplary embodiment, the installer 3004 acquires specific information relating to a printer driver to be installed, and based on the specific information acquired before and after installation of the printer driver, the installer 3004 identifies a logical printer to be deleted and deletes the identifies logical printer from the OS 210. In the present exemplary embodiment, the installer 3004 uses configuration information acquired from a physical printer corresponding to the logical printer as the specific information.

Figure 15:
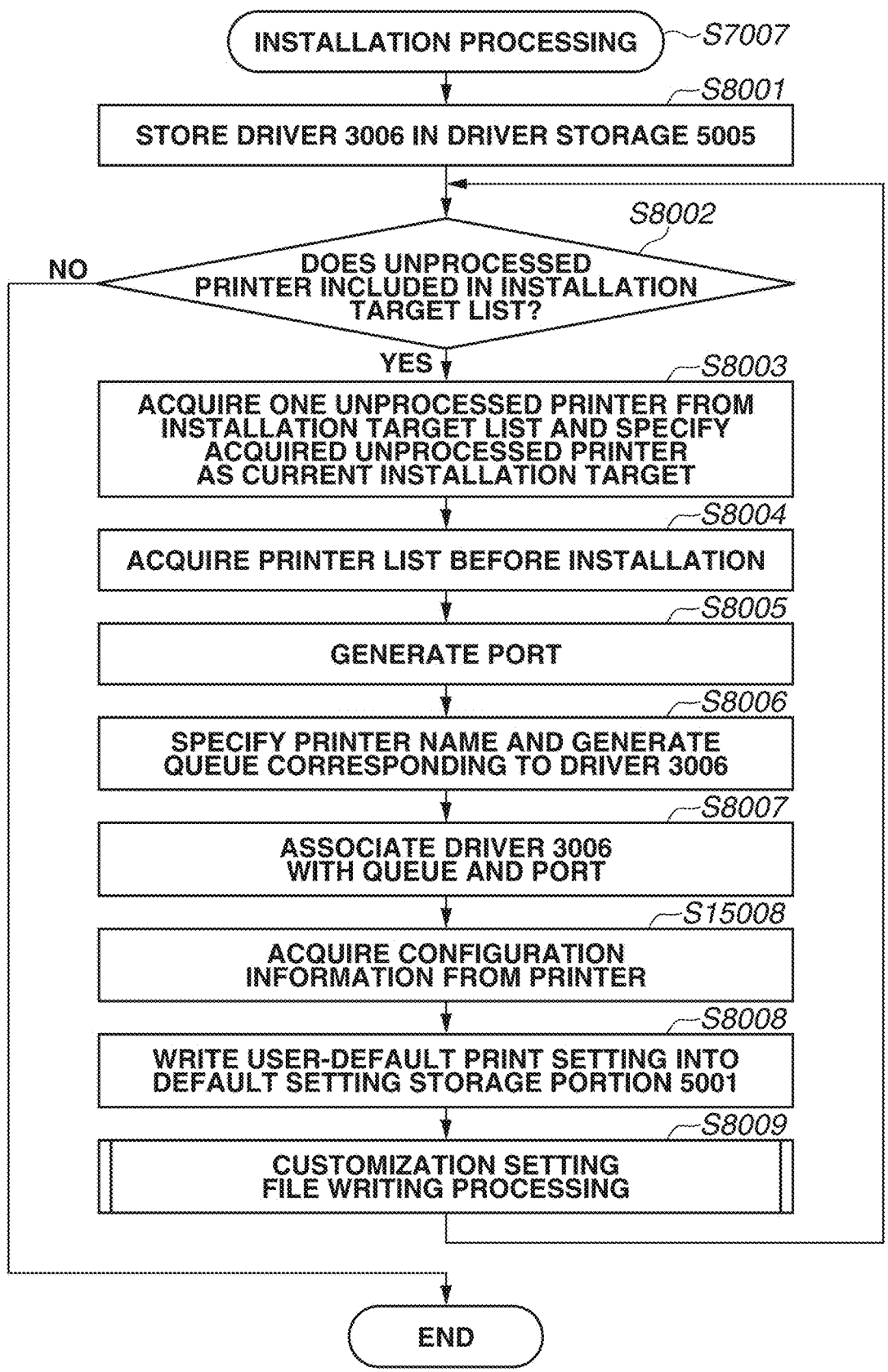
FIG. 15 is a flowchart illustrating installation processing of a customized driver.

The installation processing is similar to the processing described in the first exemplary embodiment. The present exemplary embodiment is different in the installation processing in step S7007 in FIG. 7. The installation processing of the driver 3006 as an installation target will be described with reference to a flowchart in FIG. 15. Steps of processing in FIG. 15 are almost similar to those illustrated in FIG. 8. Therefore, description thereof will be omitted except for description of the processing in step S15008 different from the processing in FIG. 8. The application and the module are stored in the external memory 209, loaded on the RAM 202 as necessary, and executed by the CPU 201 of the client computer 101.

After the installer 3004 associates the driver 3006 with the queue and the port in step S8007, in step S15008, the installer 3004 uses the generated port to acquire configuration information from the printer. The configuration information includes information indicating how many cassettes are included in the device, information indicating whether a finisher is provided, and information indicating whether stapling can be executed. The customization setting file writing processing executed in subsequent step S8009 is similar to the processing in the first exemplary embodiment illustrated in FIG. 9. The processing is different in the processing content of step S9007, i.e., the identification processing of the installed queue in FIG. 9. This processing will be described below. If installation is executed on all of the devices in the installation target list, the installation processing is completed.

Figure 16:
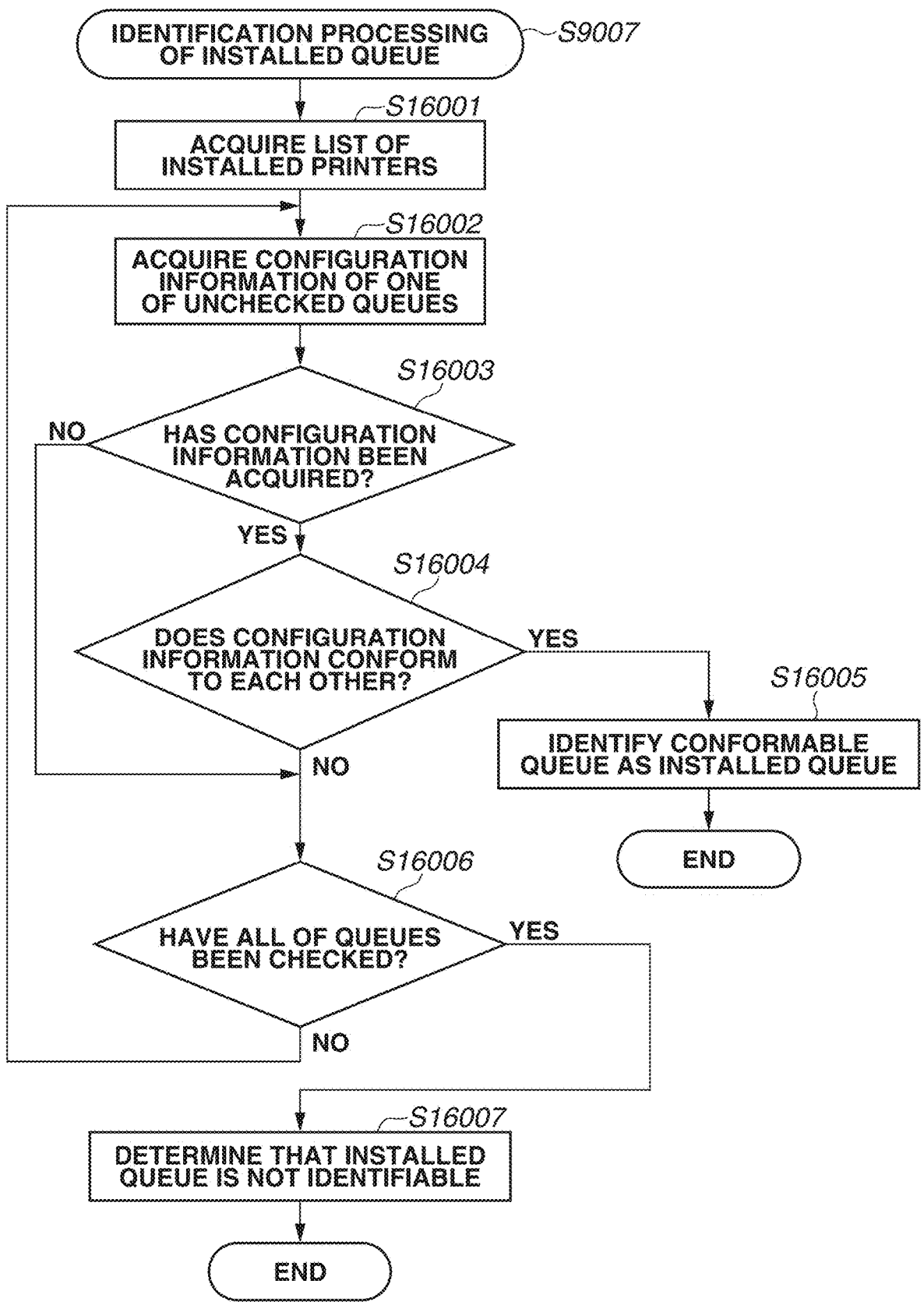
FIG. 16 is a flowchart illustrating identification processing of an installed queue.

The above-described identification processing of the installed queue in step S9007 will be described with reference to FIG. 16. The application and the module are stored in the external memory 209, loaded on the RAM 202 as necessary, and executed by the CPU 201 of the client computer 101.

First, in step S16001, the installer 3004 acquires a list of installed printers. In step S16002, from the printer list, the installer 3004 acquires configuration information of one of the unchecked queues. In step S16003, the installer 3004 further confirms whether the installer 3004 has acquired the configuration information. If the configuration information cannot be acquired (NO in step S16003), the processing proceeds to step S16006. In step S16006, the installer 3004 confirms whether all of the queues have been checked. If the configuration information can be acquired (YES in step S16003), the processing proceeds to step S16004. In step S16004, the installer 3004 confirms whether the acquired configuration information conforms to the configuration information acquired in step S15008. If the configuration information conforms to each other (YES in step S16004), the processing proceeds to step S16005. In step S16005, the installer 3004 identifies the conformable queue as the installed queue. Then, the identification processing of the installed queue is ended. If the configuration information does not conform to each other (NO in step S16004), the processing proceeds to step S16006. In step S16006, the installer 3004 confirms whether all of the queues have been checked. If not all of the queues have been checked (NO in step S16006), the processing is repeatedly executed from step S16002. If all of the queues have been checked (YES in step S16006), the processing proceeds to step S16007. In step S16007, the installer 3004 determines that the installed queue is not identifiable because there is no conformable queue. Then, the identification processing of the installed queue is ended.

As described above, in a case where the installer 3004 cannot execute setting of the customization information, the installer 3004 acquires information from the printer when the queue is generated, and executes identification of the installed queue by using that information. Then, the installer 3004 identifies the print queue for which the customization setting has failed, so that the installer 3004 can surely delete the print queue by specifying the printer name. Therefore, it is possible to prevent an erroneous operation or an unexpected operation due to the driver being operated according to incomplete information.

A fifth exemplary embodiment will be described. In the fourth exemplary embodiment, the installer 3004 acquires information from the printer when the queue is generated, and executes identification of the installed logical printer by using the acquired information. In the present exemplary embodiment, the installer 3004 executes identification of the installed queue by using unique information generated by the OS 210 in association with the queue when the queue is generated.

Figure 17:
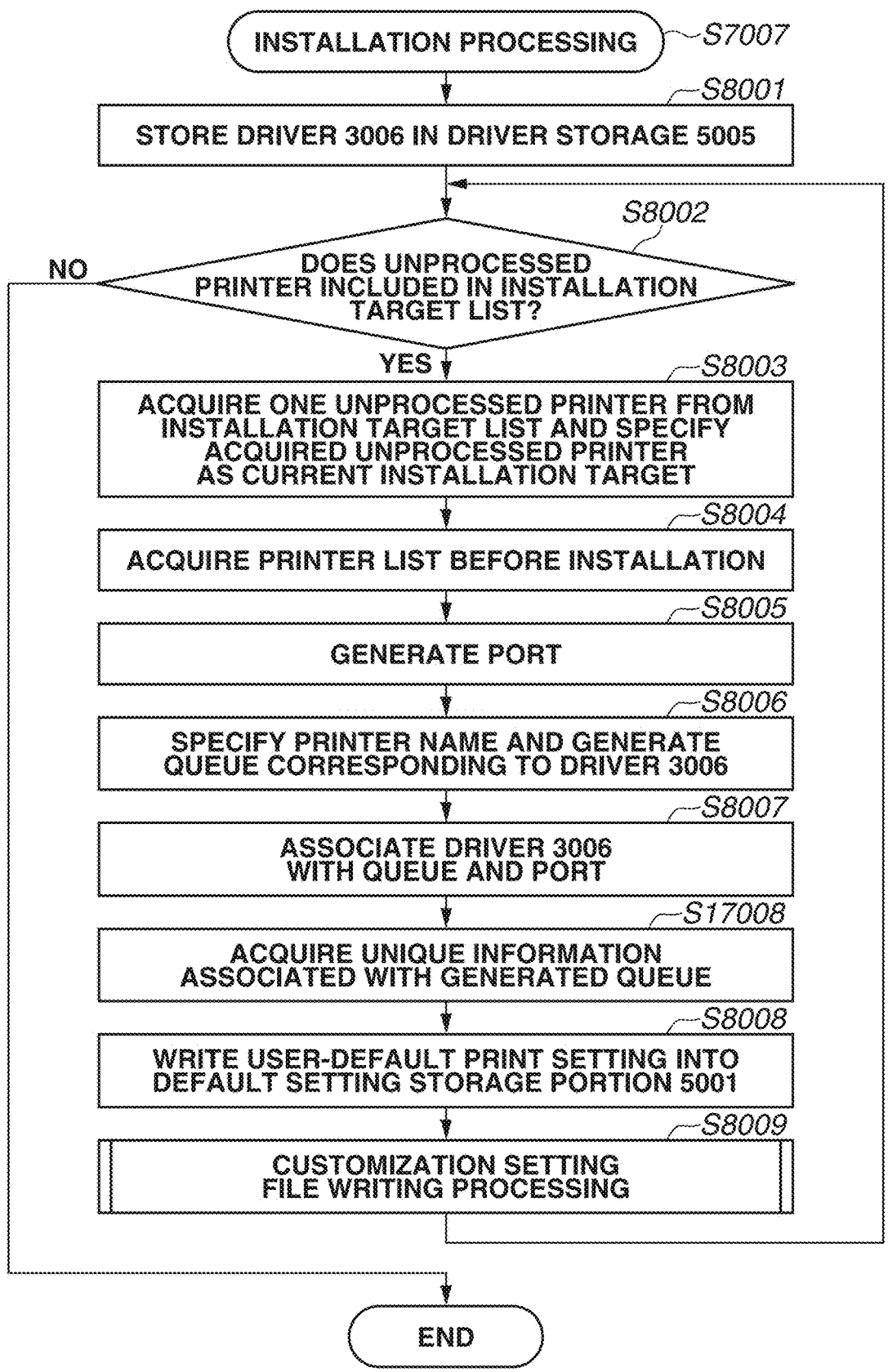
FIG. 17 is a flowchart illustrating installation processing of a customized driver.

The installation processing is similar to the processing described in the first exemplary embodiment. The present exemplary embodiment is different in the installation processing in step S7007 in FIG. 7. The installation processing of the driver 3006 as an installation target will be described with reference to a flowchart in FIG. 17. Steps of processing in FIG. 17 are almost similar to those in FIG. 8. Therefore, description thereof will be omitted except for description of the processing in step S17008 different from the processing in FIG. 8. The application and the module are stored in the external memory 209, loaded on the RAM 202 as necessary, and executed by the CPU 201 of the client computer 101.

After the installer 3004 associates the driver 3006 with the queue and the port in step S8007, in step S17008, the installer 3004 acquires unique information associated with the generated queue. For example, the installer 3004 acquires an identification (ID) of the queue (i.e., identification information) as the unique information. The customization setting file writing processing executed in subsequent step S8009 is similar to the processing in the first exemplary embodiment illustrated in FIG. 9. Similar to the fourth exemplary embodiment, the processing is different in the processing content of step S9007, i.e., the identification processing of an installed queue in FIG. 9. This processing will be described below. If installation is executed on all of the devices in the installation target list, the installation processing is completed.

Figure 18:
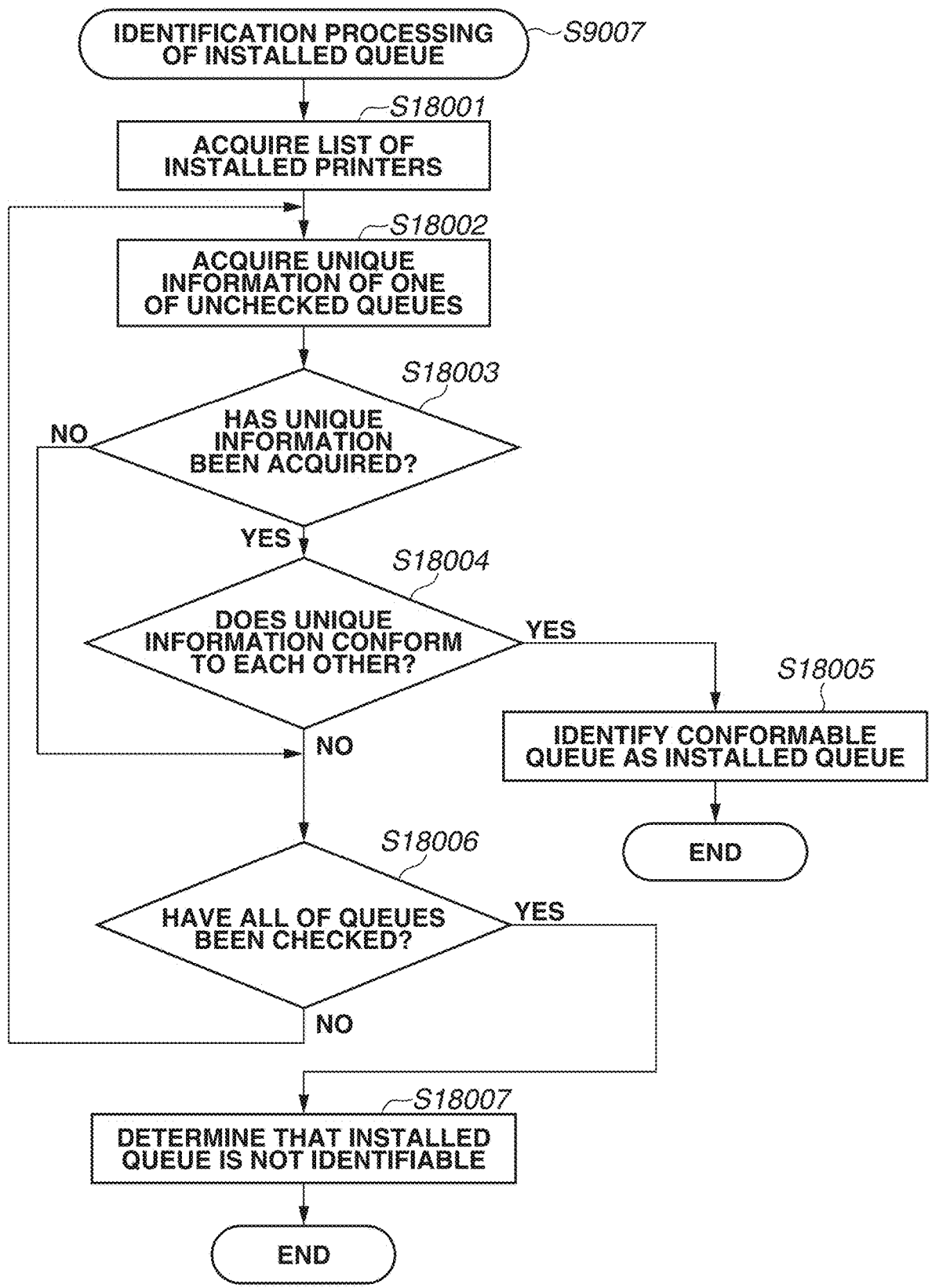
FIG. 18 is a flowchart illustrating identification processing of an installed queue.

The above-described identification processing of the installed queue in step S9007 will be described with reference to FIG. 18. The application and the module are stored in the external memory 209, loaded on the RAM 202 as necessary, and executed by the CPU 201 of the client computer 101.

First, in step S18001, the installer 3004 acquires a list of installed printers. In step S18002, from the printer list, the installer 3004 acquires unique information of one of the unchecked queues. In step S18003, the installer 3004 confirms whether the unique information has been acquired. If the unique information cannot be acquired (NO in step S18003), the processing proceeds to step S18006. In step S18006, the installer 3004 confirms whether all of the queues have been checked. If the unique information can be acquired (YES in step S18003), the processing proceeds to step S18004. In step S18004, the installer 3004 confirms whether the acquired unique information conforms to the unique information acquired in step S17008. If the unique information conforms to each other (YES in step S18004), the processing proceeds to step S18005. In step S18005, the installer 3004 identifies the conformable queue as the installed queue. Then, the identification processing of the installed queue is ended. If the unique information does not conform to each other (NO in step S18004), the processing proceeds to step S18006. In step S18006, the installer 3004 confirms whether all of the queues have been checked. If not all of the queues have been checked (NO in step S18006), the processing is repeatedly executed from step S18002. If all of the queues have been checked (YES in step S18006), the processing proceeds to step S18007. In step S18007, the installer 3004 determines that the installed queue is not identifiable because there is no conformable queue. Then, the identification processing of the installed queue is ended.

As described above, in a case where the installer 3004 cannot execute setting of the customization information, the installer 3004 executes identification of the installed queue by using the unique information generated by the OS 210 in association with the queue when the queue is generated. Then, the installer 3004 identifies the print queue for which the customization setting has failed, so that the installer 3004 can surely delete the print queue by specifying the printer name. Therefore, it is possible to prevent an erroneous operation or an unexpected operation due to the driver being operated according to incomplete information.

According to embodiments of the present invention, even if adding of the customization information to the database has failed, the logical printer is deleted from the operating system so that such a possibility can be reduced that an unintended logical printer is left in the operating system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-125531, filed Jun. 27, 2017, which is hereby incorporated by reference herein in its entirety.

What is claimed is:

1. An information processing apparatus configured to execute an installer of a printer driver on an operating system of the information processing apparatus, the information processing apparatus comprising:
   at least one processor which functions, by executing the installer on the operating system, as:
   an obtaining unit configured to obtain, from the operating system, information of logical printers existing on the operating system;
   a generation unit configured to cause the operating system to generate a logical printer associated with the printer driver after the obtainment;
   an association unit configured to associate customization information for changing a print setting of the printer driver with the generated logical printer;
   a determination unit configured to determine whether the association of the customization information has failed; and
   a processing unit configured to cause the operating system to delete a logical printer based on a determination that the association of the customization information has failed,
   wherein the processing unit is configured to (a) obtain from the operating system, information of logical printers existing on the operating system after the generation, (b) identify a logical printer by comparing the information obtained before the generation and the information obtained after the generation, and (c) cause the operating system to delete the identified logical printer.

2. The information processing apparatus according to claim 1, wherein the at least one processor further acts as:

a second determination unit configured to determine whether the operating system includes the generated logical printer, wherein, if the determination unit determines that the association of the customization information has failed with respect to the logical printer and the second determination unit determines that the operating system includes the generated logical printer, the processing unit deletes the generated logical printer from the operating system.

3. The information processing apparatus according to claim 1, wherein the at least one processor further act as:

an acquisition unit configured to acquire a list of logical printers included in the operating system; and a second determination unit configured to determine whether the operating system includes a logical printer to be deleted based on the list of logical printers acquired before the printer driver is installed and the list of logical printers acquired after the printer driver is installed, wherein, if the determination unit determines that the association of the customization information has failed with respect to the logical printer and the second determination unit determines that the operating system includes the logical printer to be deleted, the processing unit deletes the logical printer to be deleted from the operating system.

4. The information processing apparatus according to claim 3, wherein the acquisition unit acquires specific information written into a logical printer, wherein the second determination unit determines whether the operating system includes the logical printer from which the specific information is acquirable based on the lists of logical printers acquired before and after the printer driver is installed, and wherein, if the determination unit determines that the association of the customization information has failed with respect to the logical printer and the second determination unit determines that the operating system includes the logical printer from which the specific information is acquirable, the processing unit deletes, from the operating system, the logical printer from which the specific information is acquirable.

5. The information processing apparatus according to claim 1, wherein the at least one processor further acts as:

a second determination unit configured to determine whether the operating system includes the generated logical printer, wherein the printer driver is installed by specifying port information, and wherein, if the determination unit determines that the association of the customization information has failed with respect to the logical printer and the second determination unit determines that the operating system does not include the generated logical printer, the processing unit deletes a logical printer conforming to the specified port information from the operating system.

6. The information processing apparatus according to claim 1, wherein the at least one processor further acts as:

an acquisition unit configured to acquire specific information relating to the printer driver to be installed; and a second determination unit configured to determine whether the operating system includes the generated logical printer, wherein, if the determination unit determines that the association of the customization information has failed with respect to the logical printer and the second determination unit determines that the operating system does not include the generated logical printer, the processing unit identifies a logical printer to be deleted based on the specific information acquired before the printer driver is installed and the specific information acquired after the printer driver is installed, and deletes the identified logical printer from the operating system.

7. The information processing apparatus according to claim 6, wherein the acquisition unit acquires, as the specific information, configuration information from a physical printer corresponding to a logical printer, and wherein the processing unit identifies the logical printer to be deleted based on the configuration information acquired before the printer driver is installed and the configuration information acquired after the printer driver is installed, and deletes the identified logical printer from the operating system.

8. The information processing apparatus according to claim 6, wherein the acquisition unit acquires identification information about a logical printer as the specific information, and wherein the processing unit identifies the logical printer to be deleted based on the identification information acquired before the printer driver is installed and the identification information acquired after the printer driver is installed, and deletes the identified logical printer from the operating system.

9. The information processing apparatus according to claim 1, wherein the at least one processor further acts as:

a display control unit configured to display an error message on a display device when the determination unit determines that the association of the customization information has failed with respect to the logical printer.

10. The information processing apparatus according to claim 1, wherein the processing unit deletes the generated logical printer corresponding to the printer driver without deleting the printer driver installed in a driver store.

11. The information processing apparatus according to claim 1, wherein the at least one processor further functions as:

a first obtaining unit configured to obtain a first list of logical printers in the apparatus before generating the logical printer; and a second obtaining unit configured obtain a second list of logical printers in the apparatus after generating the logical printer, wherein the processing unit is configured to specify the generated logical printer by comparing the first list and second list.

12. A control method of controlling an information processing apparatus configured to execute an installer of a printer driver on an operating system of the information processing apparatus, the control method comprising:

obtaining, from the operating system, information of logical printers existing on the operating system;

causing the operating system to generate a logical printer associated with the printer driver after the obtainment;

associating customization information for changing a print setting of the printer driver with the generated logical printer;

determining whether the association of the customization information has failed; and causing the operating system to delete a logical printer based on a determination that the association of the customization information has failed, wherein causing the operating system to delete the logical printer comprises (a) obtaining from the operating system, information of logical printers existing on the operating system after the generation, (b) identifying a logical printer by comparing the information obtained before the generation and the information obtained after the generation, and (c) causing the operating system to delete the identified logical printer.

13. The control method according to claim 12, further comprising determining, by second determining, whether the operating system includes the generated logical printer, wherein, if the determining determines that the association of the customization information has failed with respect to the logical printer and the second determining determines that the operating system includes the generated logical printer, the causing the operating system to delete the logical printer comprises deleting the generated logical printer from the operating system.

14. The control method according to claim 12, further comprising:

acquiring a list of logical printers included in the operating system; and determining, by second determining, whether the operating system includes a logical printer to be deleted based on the list of logical printers acquired before the printer driver is installed and the list of logical printers acquired after the printer driver is installed, wherein, if the determining determines that the association of the customization information has failed with respect to the logical printer and the second determining determines that the operating system includes the logical printer to be deleted, the causing the operating system to delete the logical printer comprises deleting the logical printer to be deleted from the operating system.

15. The control method according to claim 14, wherein the acquiring acquires specific information written into a logical printer, wherein the second determining determines whether the operating system includes the logical printer from which the specific information is acquirable based on the lists of logical printers acquired before and after the printer driver is installed, and wherein, if the determining determines that the association of the customization information has failed with respect to the logical printer and the second determining determines that the operating system includes the logical printer from which the specific information is acquirable, the causing the operating system to delete the logical printer comprises deleting, from the operating system, the logical printer from which the specific information is acquirable.

16. The control method according to claim 12, further comprising determining, by second determining, whether the operating system includes the generated logical printer, wherein the installing installs the printer driver by specifying port information, and wherein, if the determining determines that the association of the customization information has failed with respect to the logical printer and the second determining determines that the operating system does not include the generated logical printer, the causing the operating system to delete the logical printer comprises deleting a logical printer conforming to the specified port information from the operating system.

17. The control method according to claim 12, further comprising:

acquiring specific information relating to the printer driver to be installed; and determining, by second determining, whether the operating system includes the generated logical printer, wherein, if the determining determines that the association of the customization information has failed with respect to the logical printer and the second determining determines that the operating system does not include the generated logical printer, the causing the operating system to delete the logical printer comprises identifying a logical printer to be deleted based on the specific information acquired before the printer driver is installed and the specific information acquired after the printer driver is installed, and deleting the identified logical printer from the operating system.

18. The control method according to claim 17, wherein the acquiring acquires, as the specific information, configuration information from a physical printer corresponding to a logical printer, and wherein the deleting identifies the logical printer to be deleted based on the configuration information acquired before the printer driver is installed and the configuration information acquired after the printer driver is installed, and deletes the identified logical printer from the operating system.

19. The control method according to claim 17, wherein the acquiring acquires identification information about a logical printer as the specific information, and wherein the deleting identifies the logical printer to be deleted based on the identification information acquired before the printer driver is installed and the identification information acquired after the printer driver is installed, and deletes the identified logical printer from the operating system.

20. The control method according to claim 12, wherein the causing the operating system to delete the logical printer comprises deleting the generated logical printer corresponding to the printer driver without deleting the printer driver installed in a driver store.

21. An information processing apparatus configured to execute an installer of a printer driver on an operating system of the information processing apparatus, the information processing apparatus comprising:

at least one processor which functions, by executing the installer on the operating system, as:

an obtaining unit configured to obtain, from the operating system, information of logical printers existing on the operating system;

a generation unit configured to cause the operating system to generate a logical printer associated with the printer driver after the obtainment;

an association unit configured to associate customization information for changing a print setting of the printer driver with the generated logical printer;

a determination unit configured to determine that the association of the customization information has failed; and a processing unit configured to cause the operating system to delete a logical printer with which the association of the customization information has failed, wherein the processing unit is configured to (a) obtain from the operating system, information of logical printers existing on the operating system after the generation, (b) identify a logical printer by comparing the information obtained before the generation and the information obtained after the generation, and (c) cause the operating system to delete the identified logical printer.

22. The information processing apparatus according to claim 21, wherein the at least one processor further functions as:
   a first obtaining unit configured to obtain a first list of logical printers in the apparatus before generating the logical printer; and
   a second obtaining unit configured obtain a second list of logical printers in the apparatus after generating the logical printer,
   wherein the processing unit is configured to specify the generated logical printer by comparing the first list and second list.

* * * * *